United States Patent [19]

Wainauski et al.

[11] Patent Number: 4,830,574
[45] Date of Patent: May 16, 1989

[54] AIRFOILED BLADE

[75] Inventors: Harry S. Wainauski, Simsbury, Conn.; Carol Vaczy, Swampscott, Mass.

[73] Assignee: United Technologies Corporation, Hartford, Conn.

[21] Appl. No.: 163,901

[22] Filed: Feb. 29, 1988

[51] Int. Cl.[4] ............................................... B64C 11/18
[52] U.S. Cl. ................... 416/223 R; 416/242; 416/DIG. 2
[58] Field of Search ................ 416/223 R, 237, 242, 416/243, DIG. 2; 415/181; 244/35 R

[56] References Cited

U.S. PATENT DOCUMENTS

| | | | |
|---|---|---|---|
| 2,709,052 | 5/1955 | Berg | 244/35 R |
| 4,325,675 | 4/1982 | Gallot et al. | 416/223 R |
| 4,412,664 | 11/1983 | Noonan | 416/223 R X |
| 4,416,434 | 11/1983 | Thibert et al. | 416/223 R X |
| 4,459,083 | 7/1984 | Bingham | 244/35 R X |
| 4,519,746 | 5/1985 | Wainauski et al. | 416/223 R |
| 4,564,337 | 1/1986 | Zimmer et al. | 416/242 X |
| 4,569,633 | 2/1986 | Flemming, Jr. | 416/242 X |
| 4,611,773 | 9/1986 | Goldhammer et al. | 244/35 R |

Primary Examiner—Robert E. Garrett
Assistant Examiner—Joseph M. Pitko
Attorney, Agent, or Firm—Lloyd D. Doigan

[57] ABSTRACT

A blade is comprised of a plurality of a family of airfoil sections, each section being characterized by a large leading edge radii, a camber having an apogee at approximately 45% of the airfoil section chord length and relatively blunt trailing edge. The airfoil sections taper in thickness ratio (h/b) from about 20% near the blade root to about 2% near the blade tip. The maximum thickness for each airfoil section increases along the chord length from about 39% of the airfoil section for a 20% airfoil section to about 42% of the airfoil section chord length of a 2% airfoil section. As such, the novel blade of the invention provides superior aerodynamic performance to the NACA Series 16 airfoil in the Mach 0.50 to 0.70 range with less susceptibility to foreign object damage and handling problems.

2 Claims, 4 Drawing Sheets

AIRFOILED BLADE

TECHNICAL FIELD

This invention relates to a propeller blade and more particularly a propeller blade comprised of a new airfoil family.

BACKGROUND ART

In order to minimize propeller weight, it is desirable to utilize narrow chord blades. Such blades must have high operating lift coefficients, however, to be able to develop required take-off thrust, and must have low operating lift coefficients required for efficient cruise operation. Such operating efficiency is particularly important for aircraft whose mission profile requires extensive loitering and high speed cruising.

Prior art propeller blades do not meet these requirements particularly for aircraft that cruise in the Mach 0.50 to 0.70 range. NACA Series 16 blades, in particular, may experience unacceptable shock losses at take-off, loiter and cruise speeds. Accordingly, new airfoil families for use in propeller blades are sought.

DISCLOSURE OF THE INVENTION

It is an object of the present invention to create a blade incorporating a family of airfoil sections which provide high operating lift coefficients at take-off and efficient operating characteristics at cruising and loitering speeds.

It is a further object of the invention to minimize take-off and cruise shock losses on propeller blades comprised of a family of airfoils which are designed for aircraft that operate in the Mach 0.50 to 0.70 range.

It is an object of the invention to create a blade having airfoil cross-sections that are less susceptible to foreign object damage.

It is a further object of the invention to create a blade having airfoil cross-sections that are relatively easy to handle.

According to the invention, a blade is comprised of a plurality of a family of airfoil sections, each section being characterized by a large leading edge radii, a camber having an apogee at approximately 45% of the airfoil section chord length and a relatively blunt trailing edge. The airfoil sections taper in thickness ratio (thickness/blade length) from about 20% near the blade root to about 2% near the blade tip. The maximum thickness for each airfoil section increases along the chord length from about 39% of the chord length of a 20% airfoil section to about 42% of the chord length of a 2% airfoil section. As such, the novel blade of the invention provides superior aerodynamic performance to the NACA Series 16 airfoil in the Mach 0.50 to 0.70 range with less susceptibility to foreign object damage and handling problems.

These and other objects, features and advantages of the present invention will become more apparent in light of the following detailed description of a best mode embodiment thereof, as illustrated in the accompanying drawing.

BEST MODE FOR CARRYING OUT THE INVENTION

Figure 1:
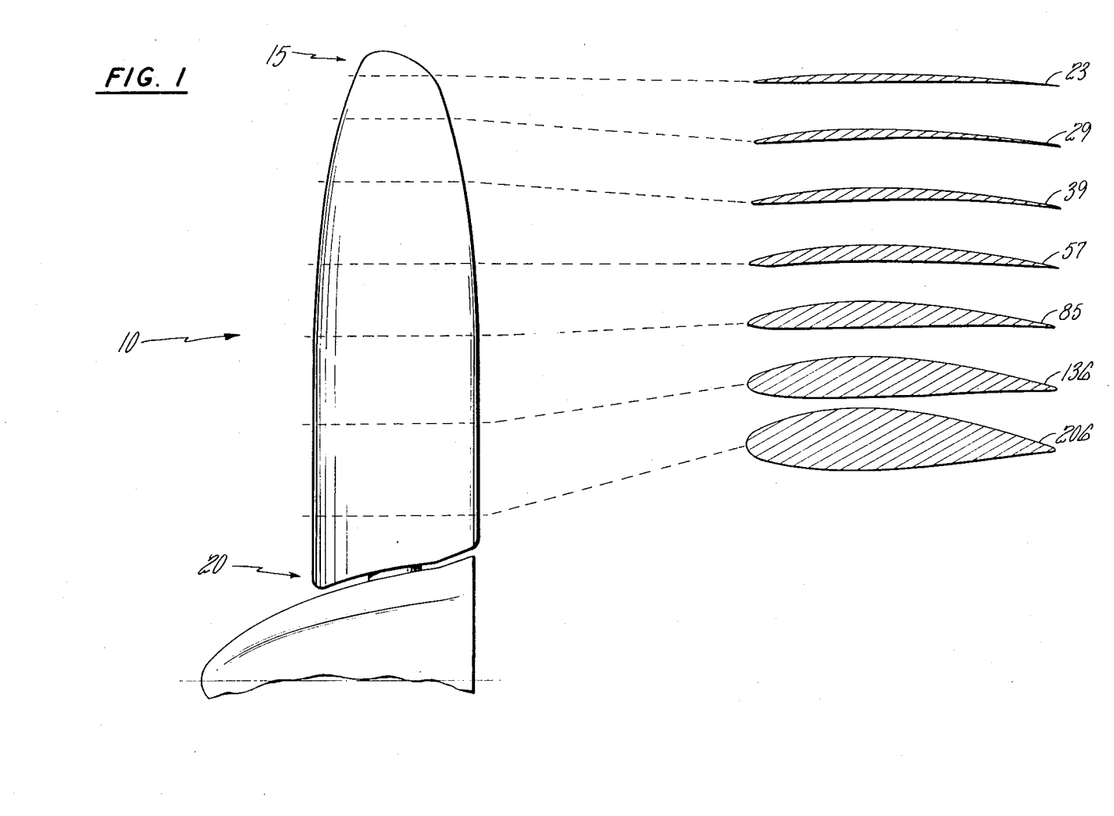
FIG. 1 is a Series of cross-sectional elevations of the airfoil of the present invention and a plan view of a blade showing exemplary locations, along the blade axis of those sections, various of the airfoils being enlarged to show details of the shape thereof.

Referring to FIG. 1, a series of cross-sections of the airfoil blade 10 of the present invention is shown. The blade has a tip portion 15 and a root portion 20. Each airfoil section of the blade is identified by indicia comprising two numerals equal to the thickness ratio (thickness/length) multiplied by 1,000. Thus, for example, the uppermost airfoil section 23 is characterized by a thickness ratio of 0.023, the second airfoil section 29 is characterized by a thickness ratio of 0.029, the third airfoil section 39 is characterized by a thickness ratio of 0.039, the fourth airfoil section 57 is characterized by a thickness ratio of 0.057. The fifth airfoil section 85 is characterized by a thickness ratio of 0.085, the sixth airfoil section 136 is characterized by a thickness ratio of 0.136, and the seventh airfoil section 206 is characterized by a thickness ratio of 0.206.

Still referring to FIG. 1, it is seen that the 23 airfoil cross-section is taken at a location approximately 0.90 of the blade longitudinal axis from the root portion 20 thereof. The 29 airfoil cross-section is taken at a location approximately 0.85 of the length of the blade longitudinal axis from the root portion 20 thereof. The 39 cross-section is taken at location approximately 0.76 of the length of the blade longitudinal axis from the root portion. Similarly, the 57 cross-section is taken at approximately 0.53 of the length, the 85 cross-section is taken at approximately 0.45 of the length, the 136 section is taken at approximately 0.29 of the length and the 206 section is taken at approximately 0.23 the length of the blade longitudinal axis from the root portion. It will of course be understood that while the chords of the airfoil sections are illustrated as being of a common length, design considerations regarding blade taper will dictate the relative sizes of the airfoil sections and the present invention shall not be limited to any specific size relationship between the airfoil sections.

Cross-sections of the blade between the airfoil sections shown in FIG. 1 are defined by a transition surface connecting corresponding portions between any two adjacent airfoil shapes as is well known in the art. The airfoil cross-sections will, of course, be angularly displaced from one another in a manner well known in the art to import sufficient twist to the blade to establish varying blade angles of attack dictated by aerodynamic performance requirements.

Figure 4:
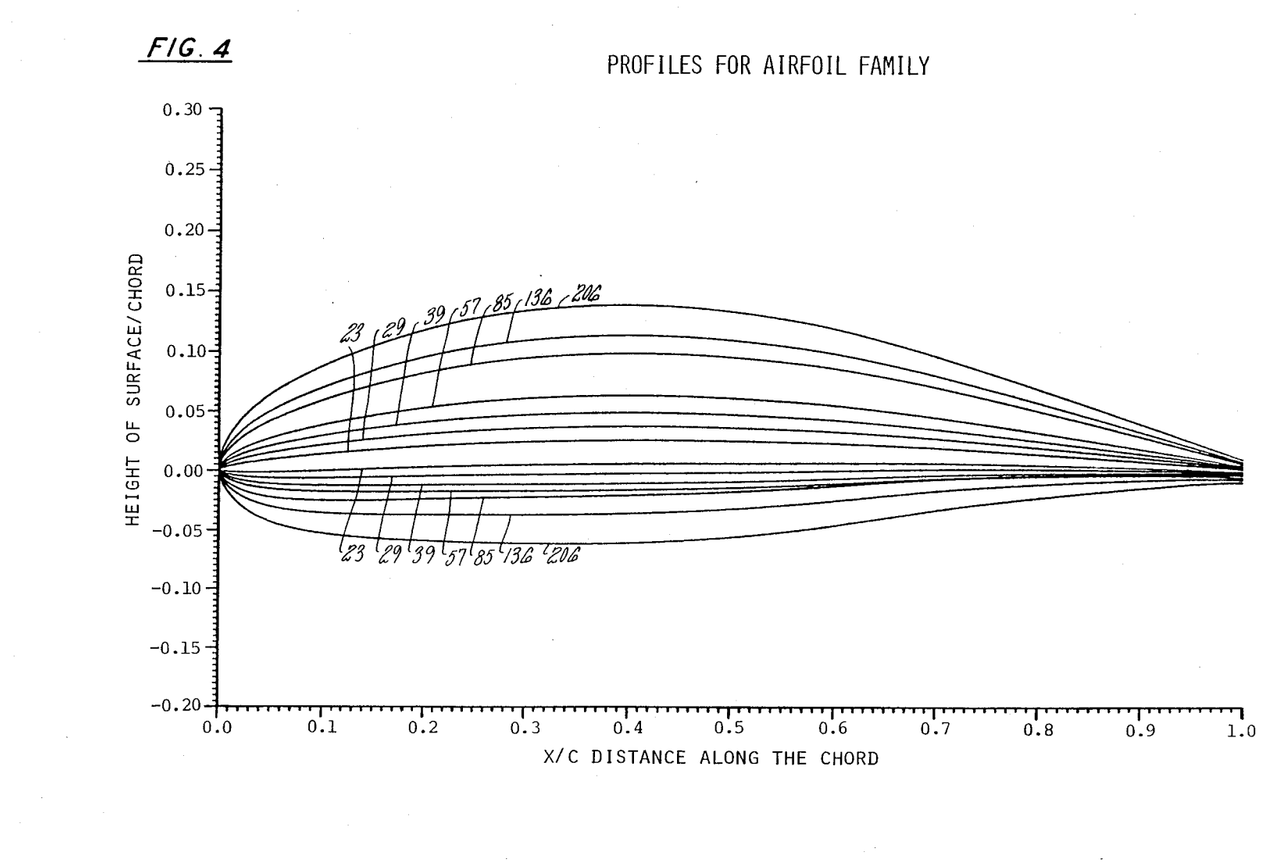
FIG. 4 is a graphical representation of the airfoil sections of the present invention.

The following tables list precise dimensionless coordinates of a number of airfoil sections of an embodiment of a blade of the present invention. The x/c values are dimensionless locations on the blade chord line. The y/c upper are the dimensionless heights from the chord line to points on a blade suction surface. The y/c lower are the dimensionless heights from the chord line to points on a blade pressure surface. The t/c values are dimensionless heights from the chord line to the curvature of the mean line (i.e. camber) of each airfoil section. The shapes of the particular airfoil sections described below are shown in FIG. 4.

HS202 AIRFOIL
h/b = .023
23 Airfoil Section

| Thickness | | | | Camber | |
|---|---|---|---|---|---|
| Upper | | Lower | | | |
| x/c | y/c | x/c | y/c | x/c | t/c |
| 0.0000000 | 0.0000000 | 0.0000000 | 0.0000000 | 0.000010 | 0.0 |
| 0.0000080 | 0.0000209 | 0.0000140− | 0.0000159 | 0.000021 | 0.000002 |
| 0.0005594 | 0.0006793 | 0.0007288− | 0.0004493 | 0.000654 | 0.000092 |
| 0.0010783 | 0.0010084 | 0.0013101− | 0.0006033 | 0.001204 | 0.000162 |
| 0.0021049 | 0.0015115 | 0.0024139− | 0.0007884 | 0.002269 | 0.000289 |
| 0.0031216 | 0.0019351 | 0.0034836− | 0.0009220 | 0.003312 | 0.000405 |
| 0.0051403 | 0.0026582 | 0.0055756− | 0.0011259 | 0.005367 | 0.000613 |
| 0.0076519 | 0.0034234 | 0.0081490− | 0.0013111 | 0.007909 | 0.000845 |
| 0.0101592 | 0.0040879 | 0.0107026− | 0.0014504 | 0.010439 | 0.001055 |
| 0.0201769 | 0.0062235 | 0.0208485− | 0.0017597 | 0.020519 | 0.001785 |
| 0.0301895 | 0.0079187 | 0.0309555− | 0.0018427 | 0.030577 | 0.002430 |
| 0.0402022 | 0.0093762 | 0.0410505− | 0.0017749 | 0.040629 | 0.003040 |
| 0.0602284 | 0.0119039 | 0.0612155− | 0.0013390 | 0.060721 | 0.004225 |
| 0.0702405 | 0.0130500 | 0.0712849− | 0.0010208 | 0.070760 | 0.004811 |
| 0.0802512 | 0.0141429 | 0.0813419− | 0.0006585 | 0.080792 | 0.005393 |
| 0.0902581 | 0.0151953 | 0.0913826− | 0.0002676 | 0.090814 | 0.005970 |
| 0.1002631 | 0.0162093 | 0.1014092 | 0.0001386 | 0.100828 | 0.006538 |
| 0.1102658 | 0.0171871 | 0.1114241 | 0.0005541 | 0.110835 | 0.007095 |
| 0.1202673 | 0.0181287 | 0.1214342 | 0.0009697 | 0.120839 | 0.007638 |
| 0.1302695 | 0.0190370 | 0.1314436 | 0.0013887 | 0.130843 | 0.008169 |
| 0.1402709 | 0.0199175 | 0.1414498 | 0.0018095 | 0.140845 | 0.008689 |
| 0.1602683 | 0.0215871 | 0.1614357 | 0.0026443 | 0.160833 | 0.009691 |
| 0.1702647 | 0.0223794 | 0.1714128 | 0.0030552 | 0.170818 | 0.010172 |
| 0.1802581 | 0.0231354 | 0.1813751 | 0.0034544 | 0.180794 | 0.010634 |
| 0.1902500 | 0.0238550 | 0.1913247 | 0.0038370 | 0.190763 | 0.011075 |
| 0.2002393 | 0.0245356 | 0.2012631 | 0.0042016 | 0.200725 | 0.011493 |
| 0.2102287 | 0.0251746 | 0.2111973 | 0.0045458 | 0.210685 | 0.011886 |
| 0.2202177 | 0.0257691 | 0.2211299 | 0.0048635 | 0.220644 | 0.012251 |
| 0.2302073 | 0.0263234 | 0.2310639 | 0.0051592 | 0.230604 | 0.012591 |
| 0.2401963 | 0.0268395 | 0.2409984 | 0.0054363 | 0.240564 | 0.012908 |
| 0.2601773 | 0.0277559 | 0.2608746 | 0.0059302 | 0.260489 | 0.013472 |
| 0.2701692 | 0.0281631 | 0.2708163 | 0.0061511 | 0.270454 | 0.013723 |
| 0.2801604 | 0.0285360 | 0.2807587 | 0.0063572 | 0.280419 | 0.013955 |
| 0.2901522 | 0.0288764 | 0.2907026 | 0.0065470 | 0.290385 | 0.014167 |
| 0.3001435 | 0.0291880 | 0.3006469 | 0.0067234 | 0.300351 | 0.014362 |
| 0.3101359 | 0.0294687 | 0.3105941 | 0.0068849 | 0.310319 | 0.014539 |
| 0.3201293 | 0.0297214 | 0.3205443 | 0.0070353 | 0.320289 | 0.014700 |
| 0.3301225 | 0.0299464 | 0.3304966 | 0.0071723 | 0.330260 | 0.014845 |
| 0.3401167 | 0.0301479 | 0.3404521 | 0.0073019 | 0.340233 | 0.014977 |
| 0.3601056 | 0.0304759 | 0.3603683 | 0.0075279 | 0.360182 | 0.015199 |
| 0.3701000 | 0.0306060 | 0.3703276 | 0.0076289 | 0.370157 | 0.015291 |
| 0.3800947 | 0.0307117 | 0.3802865 | 0.0077222 | 0.380132 | 0.015371 |
| 0.3900894 | 0.0307962 | 0.3902453 | 0.0078107 | 0.390107 | 0.015440 |
| 0.4000853 | 0.0308559 | 0.4002072 | 0.0078911 | 0.400084 | 0.015496 |
| 0.4100807 | 0.0308924 | 0.4101713 | 0.0079666 | 0.410062 | 0.015541 |
| 0.4200771 | 0.0309078 | 0.4201385 | 0.0080392 | 0.420042 | 0.015576 |
| 0.4300733 | 0.0308998 | 0.4301059 | 0.0081073 | 0.430022 | 0.015600 |
| 0.4400703 | 0.0308716 | 0.4400744 | 0.0081705 | 0.440003 | 0.015614 |
| 0.4600642 | 0.0307557 | 0.4600138 | 0.0082893 | 0.459966 | 0.015615 |
| 0.4700617 | 0.0306673 | 0.4699860 | 0.0083427 | 0.469949 | 0.015601 |
| 0.4800593 | 0.0305600 | 0.4799600 | 0.0083950 | 0.479933 | 0.015579 |
| 0.4900570 | 0.0304323 | 0.4899358 | 0.0084417 | 0.489918 | 0.015547 |
| 0.5000556 | 0.0302892 | 0.4999129 | 0.0084878 | 0.499904 | 0.015508 |
| 0.5100543 | 0.0301261 | 0.5098897 | 0.0085309 | 0.509890 | 0.015460 |
| 0.5200523 | 0.0299466 | 0.5198653 | 0.0085724 | 0.519875 | 0.015405 |
| 0.5300515 | 0.0297488 | 0.5298418 | 0.0086101 | 0.529861 | 0.015341 |
| 0.5400496 | 0.0295323 | 0.5398173 | 0.0086466 | 0.539846 | 0.015269 |
| 0.5600475 | 0.0290393 | 0.5597706 | 0.0087045 | 0.559818 | 0.015095 |
| 0.5700464 | 0.0287654 | 0.5697474 | 0.0087294 | 0.569804 | 0.014995 |
| 0.5800450 | 0.0284673 | 0.5797223 | 0.0087464 | 0.579789 | 0.014883 |
| 0.5900437 | 0.0281515 | 0.5896932 | 0.0087631 | 0.589772 | 0.014763 |
| 0.6000416 | 0.0278095 | 0.5996610 | 0.0087721 | 0.599753 | 0.014630 |
| 0.6100394 | 0.0274421 | 0.6096347 | 0.0087715 | 0.609737 | 0.014483 |
| 0.6200383 | 0.0270521 | 0.6196134 | 0.0087614 | 0.619724 | 0.014323 |
| 0.6300371 | 0.0266384 | 0.6295922 | 0.0087399 | 0.629711 | 0.014149 |
| 0.6400357 | 0.0262066 | 0.6395713 | 0.0087117 | 0.639698 | 0.013965 |

-continued
HS202 AIRFOIL
h/b = .023
23 Airfoil Section

| Thickness | | | | Camber | |
|---|---|---|---|---|---|
| Upper | | Lower | | | |
| x/c | y/c | x/c | y/c | x/c | t/c |
| 0.6600331 | 0.0252822 | 0.6595331 | 0.0086139 | 0.659674 | 0.013556 |
| 0.6700312 | 0.0247919 | 0.6695145 | 0.0085441 | 0.669662 | 0.013332 |
| 0.6800290 | 0.0242822 | 0.6794944 | 0.0084587 | 0.679649 | 0.013094 |
| 0.6900261 | 0.0237556 | 0.6894729 | 0.0083582 | 0.689635 | 0.012843 |
| 0.7000241 | 0.0232062 | 0.6994545 | 0.0082375 | 0.699623 | 0.012575 |
| 0.7100217 | 0.0226367 | 0.7094406 | 0.0080988 | 0.709613 | 0.012292 |
| 0.7300182 | 0.0214357 | 0.7242736 | 0.0077676 | 0.729601 | 0.011679 |
| 0.7400168 | 0.0208073 | 0.7394262 | 0.0075748 | 0.739598 | 0.011351 |
| 0.7600135 | 0.0195107 | 0.7594308 | 0.0071491 | 0.759595 | 0.010662 |
| 0.7700118 | 0.0188427 | 0.7694362 | 0.0069170 | 0.769595 | 0.010302 |
| 0.7800108 | 0.0181630 | 0.7794446 | 0.0066735 | 0.779597 | 0.009933 |
| 0.7900094 | 0.0174723 | 0.7894557 | 0.0064190 | 0.789600 | 0.009555 |
| 0.8000089 | 0.0167708 | 0.7994699 | 0.0061553 | 0.799605 | 0.009169 |
| 0.8100078 | 0.0160611 | 0.8094846 | 0.0058828 | 0.809610 | 0.008776 |
| 0.8200063 | 0.0153459 | 0.8194997 | 0.0056049 | 0.819615 | 0.008379 |
| 0.8400054 | 0.0138974 | 0.8395318 | 0.0050310 | 0.839627 | 0.007570 |
| 0.8600040 | 0.0124230 | 0.8595644 | 0.0044281 | 0.859639 | 0.006739 |
| 0.8700042 | 0.0116775 | 0.8695818 | 0.0041153 | 0.869646 | 0.006316 |
| 0.8800043 | 0.0109249 | 0.8795993 | 0.0037927 | 0.879653 | 0.005886 |
| 0.8900045 | 0.0101664 | 0.8896168 | 0.0034610 | 0.889660 | 0.005450 |
| 0.9000038 | 0.0094014 | 0.8996331 | 0.0031179 | 0.899666 | 0.005007 |
| 0.9100039 | 0.0086277 | 0.9096506 | 0.0027644 | 0.909673 | 0.004556 |
| 0.9200028 | 0.0078451 | 0.9196673 | 0.0023987 | 0.919679 | 0.004097 |
| 0.9300023 | 0.0070487 | 0.9296854 | 0.0020199 | 0.929686 | 0.003627 |
| 0.9400008 | 0.0062430 | 0.9397027 | 0.0016284 | 0.939692 | 0.003148 |
| 0.9599964 | 0.0045914 | 0.9597381 | 0.0008015 | 0.959704 | 0.002157 |
| 0.9699947 | 0.0037461 | 0.9697575 | 0.0003617 | 0.969711 | 0.001643 |
| 0.9799945 | 0.0028895 | 0.9797792− | 0.0001010 | 0.979720 | 0.001115 |
| 0.9899958 | 0.0020207 | 0.9898036− | 0.0005904 | 0.989731 | 0.000572 |
| 1.0000000 | 0.0011466 | 1.0000000− | 0.0011206 | 0.999745 | 0.000014 |

HS303 AIRFOIL
h/b = .029
19 Airfoil Section

| Thickness | | | | Camber | |
|---|---|---|---|---|---|
| Upper | | Lower | | | |
| x/c | y/c | x/c | y/c | x/c | t/c |
| 0.0000000 | 0.0000000 | 0.0000000 | 0.0000000 | 0.000010 | 0.0 |
| 0.0000064 | 0.0000261 | 0.0000156− | 0.0000201 | 0.000021 | 0.000003 |
| 0.0005161 | 0.0008460 | 0.0007721− | 0.0005700 | 0.000654 | 0.000138 |
| 0.0010190 | 0.0012545 | 0.0013693− | 0.0007684 | 0.001204 | 0.000243 |
| 0.0020259 | 0.0018781 | 0.0024927− | 0.0010100 | 0.002269 | 0.000434 |
| 0.0030290 | 0.0024026 | 0.0035759− | 0.0011865 | 0.003312 | 0.000608 |
| 0.0050288 | 0.0032974 | 0.0056866− | 0.0014592 | 0.005367 | 0.000919 |
| 0.0075244 | 0.0042443 | 0.0082758− | 0.0017100 | 0.007909 | 0.001267 |
| 0.0100197 | 0.0050659 | 0.0108432− | 0.0019015 | 0.010439 | 0.001582 |
| 0.0200040 | 0.0077032 | 0.0210196− | 0.0023464 | 0.020519 | 0.002678 |
| 0.0299919 | 0.0097911 | 0.0311505− | 0.0025001 | 0.030577 | 0.003645 |
| 0.0399831 | 0.0115815 | 0.0412660− | 0.0024603 | 0.040629 | 0.004560 |
| 0.0599730 | 0.0146768 | 0.0614657− | 0.0019991 | 0.060721 | 0.006338 |
| 0.0699699 | 0.0160765 | 0.0715494− | 0.0016426 | 0.070760 | 0.007216 |
| 0.0799682 | 0.0174102 | 0.0816179− | 0.0012300 | 0.080792 | 0.008089 |
| 0.0899660 | 0.0186926 | 0.0916668− | 0.0007801 | 0.090814 | 0.008955 |
| 0.0999651 | 0.0199230 | 0.1016955− | 0.0003113 | 0.100828 | 0.009807 |
| 0.1099641 | 0.0211192 | 0.1117162 | 0.0001697 | 0.110835 | 0.010643 |
| 0.1199631 | 0.0222645 | 0.1217279 | 0.0006526 | 0.120839 | 0.011457 |
| 0.1299629 | 0.0233697 | 0.1317388 | 0.0011397 | 0.130843 | 0.012253 |
| 0.1399627 | 0.0244407 | 0.1417459 | 0.0016309 | 0.140845 | 0.013034 |
| 0.1599622 | 0.0264697 | 0.1617278 | 0.0026063 | 0.160833 | 0.014536 |
| 0.1699631 | 0.0274328 | 0.1716996 | 0.0030874 | 0.170818 | 0.015258 |
| 0.1799639 | 0.0283517 | 0.1816536 | 0.0035547 | 0.180794 | 0.015951 |
| 0.1899663 | 0.0292255 | 0.1915919 | 0.0040030 | 0.190763 | 0.016612 |
| 0.1999682 | 0.0300528 | 0.2015169 | 0.0044299 | 0.200725 | 0.017239 |
| 0.2099712 | 0.0308300 | 0.2114365 | 0.0048329 | 0.210685 | 0.017829 |
| 0.2199742 | 0.0315521 | 0.2213542 | 0.0052049 | 0.220644 | 0.018376 |
| 0.2299777 | 0.0322259 | 0.2312729 | 0.0055513 | 0.230604 | 0.018886 |
| 0.2399803 | 0.0328532 | 0.2411936 | 0.0058761 | 0.240564 | 0.019362 |
| 0.2599873 | 0.0339668 | 0.2610422 | 0.0064548 | 0.260489 | 0.020208 |
| 0.2699915 | 0.0344617 | 0.2709706 | 0.0067139 | 0.270454 | 0.020585 |
| 0.2799948 | 0.0349143 | 0.2809001 | 0.0069555 | 0.280419 | 0.020932 |
| 0.2899984 | 0.0353280 | 0.2908313 | 0.0071779 | 0.290385 | 0.021250 |

HS303 AIRFOIL
h/b = .029
19 Airfoil Section

| Thickness | | | | Camber | |
|---|---|---|---|---|---|
| Upper | | Lower | | | |
| x/c | | y/c | | x/c | t/c |
| 0.3000014 | 0.0357063 | 0.3007630 | 0.0073856 | 0.300351 | 0.021543 |
| 0.3100050 | 0.0360468 | 0.3106981 | 0.0075752 | 0.310319 | 0.021808 |
| 0.3200091 | 0.0363535 | 0.3206368 | 0.0077526 | 0.320289 | 0.022050 |
| 0.3300123 | 0.0366261 | 0.3305783 | 0.0079140 | 0.330260 | 0.022267 |
| 0.3400160 | 0.0368710 | 0.3405234 | 0.0080672 | 0.340233 | 0.022466 |
| 0.3600227 | 0.0372673 | 0.3604201 | 0.0083350 | 0.360182 | 0.022798 |
| 0.3700256 | 0.0374248 | 0.3703699 | 0.0084555 | 0.370157 | 0.022937 |
| 0.3800291 | 0.0375518 | 0.3803192 | 0.0085666 | 0.380132 | 0.023056 |
| 0.3900325 | 0.0376533 | 0.3902684 | 0.0086731 | 0.390107 | 0.023160 |
| 0.4000367 | 0.0377240 | 0.4002211 | 0.0087704 | 0.400084 | 0.023244 |
| 0.4100396 | 0.0377664 | 0.4101769 | 0.0088620 | 0.410062 | 0.023311 |
| 0.4200432 | 0.0377838 | 0.4201360 | 0.0089506 | 0.420042 | 0.023364 |
| 0.4300463 | 0.0377721 | 0.4300957 | 0.0090344 | 0.430022 | 0.023400 |
| 0.4400502 | 0.0377349 | 0.4400564 | 0.0091136 | 0.440003 | 0.023421 |
| 0.4600573 | 0.0375888 | 0.4599810 | 0.0092636 | 0.459966 | 0.023423 |
| 0.4700608 | 0.0374786 | 0.4699461 | 0.0093319 | 0.469949 | 0.023402 |
| 0.4800640 | 0.0373454 | 0.4799138 | 0.0093990 | 0.479933 | 0.023369 |
| 0.4900669 | 0.0371865 | 0.4898832 | 0.0094599 | 0.489918 | 0.023320 |
| 0.5000705 | 0.0370085 | 0.4998546 | 0.0095219 | 0.499904 | 0.023262 |
| 0.5100745 | 0.0368071 | 0.5098255 | 0.0095793 | 0.509890 | 0.023190 |
| 0.5200778 | 0.0365847 | 0.5197949 | 0.0096357 | 0.519875 | 0.023107 |
| 0.5300823 | 0.0363400 | 0.5297651 | 0.0096884 | 0.529861 | 0.023011 |
| 0.5400859 | 0.0360726 | 0.5397397 | 0.0097397 | 0.539846 | 0.022903 |
| 0.5600943 | 0.0354638 | 0.5596754 | 0.0098264 | 0.559818 | 0.022642 |
| 0.5700984 | 0.0351266 | 0.5696460 | 0.0098656 | 0.569804 | 0.022493 |
| 0.5801026 | 0.0347582 | 0.5796145 | 0.0098959 | 0.579789 | 0.022324 |
| 0.5901086 | 0.0343694 | 0.5895778 | 0.0099266 | 0.589772 | 0.022145 |
| 0.6001132 | 0.0339483 | 0.5995375 | 0.0099477 | 0.599753 | 0.021945 |
| 0.6101168 | 0.0334962 | 0.6095045 | 0.0099578 | 0.609737 | 0.021724 |
| 0.6201204 | 0.0330164 | 0.6194776 | 0.0099575 | 0.619724 | 0.021484 |
| 0.6301239 | 0.0325077 | 0.6294510 | 0.0099441 | 0.629711 | 0.021223 |
| 0.6401271 | 0.0319770 | 0.6394246 | 0.0099227 | 0.639698 | 0.020947 |
| 0.6601328 | 0.0308426 | 0.6593763 | 0.0098310 | 0.659674 | 0.020334 |
| 0.6701347 | 0.0302413 | 0.6693531 | 0.0097602 | 0.699662 | 0.019998 |
| 0.6801367 | 0.0296168 | 0.6793279 | 0.0096706 | 0.679649 | 0.019641 |
| 0.6901382 | 0.0289718 | 0.6893011 | 0.0095635 | 0.689635 | 0.019265 |
| 0.7001399 | 0.0282990 | 0.6992782 | 0.0094322 | 0.699623 | 0.018863 |
| 0.7101399 | 0.0276018 | 0.7092609 | 0.0092792 | 0.709613 | 0.018438 |
| 0.7301382 | 0.0261347 | 0.7292441 | 0.0089081 | 0.729601 | 0.017519 |
| 0.7401362 | 0.0253668 | 0.7392428 | 0.0086898 | 0.739598 | 0.017026 |
| 0.7601300 | 0.0237840 | 0.7592485 | 0.0082064 | 0.759595 | 0.015993 |
| 0.7701260 | 0.0229693 | 0.7692553 | 0.0079409 | 0.769595 | 0.015453 |
| 0.7801222 | 0.0221403 | 0.7792658 | 0.0076618 | 0.779597 | 0.014899 |
| 0.7901173 | 0.0212982 | 0.7892795 | 0.0073697 | 0.789600 | 0.014332 |
| 0.8001125 | 0.0204432 | 0.7992971 | 0.0070666 | 0.799605 | 0.013753 |
| 0.8101068 | 0.0195789 | 0.8093154 | 0.0067527 | 0.809610 | 0.013164 |
| 0.8201008 | 0.0187071 | 0.8193342 | 0.0064323 | 0.819615 | 0.012568 |
| 0.8400904 | 0.0169428 | 0.8393741 | 0.0057703 | 0.839627 | 0.011355 |
| 0.8600795 | 0.0151474 | 0.8594145 | 0.0050734 | 0.859639 | 0.010109 |
| 0.8700749 | 0.0142393 | 0.8694360 | 0.0047113 | 0.869646 | 0.009474 |
| 0.8800700 | 0.0133233 | 0.8794575 | 0.0043372 | 0.879653 | 0.008829 |
| 0.8900653 | 0.0124003 | 0.8894789 | 0.0039519 | 0.889660 | 0.008175 |
| 0.9000598 | 0.0114689 | 0.8994992 | 0.0035532 | 0.899666 | 0.007510 |
| 0.9100550 | 0.0105282 | 0.9095206 | 0.0031417 | 0.909673 | 0.006834 |
| 0.9200489 | 0.0095762 | 0.9195416 | 0.0027155 | 0.919679 | 0.006145 |
| 0.9300433 | 0.0086085 | 0.9295639 | 0.0022730 | 0.929686 | 0.005440 |
| 0.9400364 | 0.0076287 | 0.9395856 | 0.0018166 | 0.939692 | 0.004722 |
| 0.9600210 | 0.0056219 | 0.9596304 | 0.0008490 | 0.959704 | 0.003235 |
| 0.9700135 | 0.0045956 | 0.9696547 | 0.0003331 | 0.969711 | 0.002464 |
| 0.9800072 | 0.0035563 | 0.9796817− | 0.0002099 | 0.979720 | 0.001673 |
| 0.9900023 | 0.0025025 | 0.9897115− | 0.0007863 | 0.989731 | 0.000858 |
| 1.0000000 | 0.0014427 | 1.0000000− | 0.0014168 | 0.999745 | 0.000021 |

30 Airfoil Section

| Thickness | | | | Camber | |
|---|---|---|---|---|---|
| Upper | | Lower | | | |
| x/c | | y/c | | x/c | t/c |
| 0.0000000 | 0.0000000 | 0.0000000 | 0.0000000 | 0.000010 | 0.0 |
| 0.0000049 | 0.0000341 | 0.0000171− | 0.0000281 | 0.000021 | 0.000003 |
| 0.0004720 | 0.0010901 | 0.0008162− | 0.0008141 | 0.000654 | 0.000138 |
| 0.0009586 | 0.0016032 | 0.0014296− | 0.0011171 | 0.001204 | 0.000243 |
| 0.0019454 | 0.0023759 | 0.0025731− | 0.0015078 | 0.002269 | 0.000434 |
| 0.0029346 | 0.0030210 | 0.0036700− | 0.0018048 | 0.003312 | 0.000608 |
| 0.0049152 | 0.0041171 | 0.0057998− | 0.0022790 | 0.005367 | 0.000919 |
| 0.0073945 | 0.0052705 | 0.0084049− | 0.0027363 | 0.007909 | 0.001267 |
| 0.0098777 | 0.0062667 | 0.0109823− | 0.0031024 | 0.010439 | 0.001582 |
| 0.0198281 | 0.0094354 | 0.0211937− | 0.0040789 | 0.020519 | 0.002678 |
| 0.0297908 | 0.0119100 | 0.0313488− | 0.0046193 | 0.030577 | 0.003645 |
| 0.0397602 | 0.0140019 | 0.0414854− | 0.0048810 | 0.040629 | 0.004560 |
| 0.0597130 | 0.0175510 | 0.0617203− | 0.0048738 | 0.060721 | 0.006338 |
| 0.0696945 | 0.0191306 | 0.0718186− | 0.0046973 | 0.070760 | 0.007216 |
| 0.0796803 | 0.0206233 | 0.0818987− | 0.0044438 | 0.080792 | 0.008089 |
| 0.0896689 | 0.0220489 | 0.0919559− | 0.0041342 | 0.090814 | 0.008955 |
| 0.0996618 | 0.0234164 | 0.1019928− | 0.0038005 | 0.100828 | 0.009807 |
| 0.1096572 | 0.0247303 | 0.1120133− | 0.0034423 | 0.110835 | 0.010643 |
| 0.1196536 | 0.0259895 | 0.1220268− | 0.0030733 | 0.120839 | 0.011457 |
| 0.1296510 | 0.0272013 | 0.1320392− | 0.0026930 | 0.130843 | 0.012253 |
| 0.1396491 | 0.0283721 | 0.1420470− | 0.0023017 | 0.140845 | 0.013034 |
| 0.1596507 | 0.0305827 | 0.1620251− | 0.0015080 | 0.160833 | 0.014536 |
| 0.1696562 | 0.0316288 | 0.1719915− | 0.0011099 | 0.170818 | 0.015258 |
| 0.1796647 | 0.0326259 | 0.1819369− | 0.0007209 | 0.180794 | 0.015951 |
| 0.1896777 | 0.0335727 | 0.1918638− | 0.0003456 | 0.190763 | 0.016612 |
| 0.1996924 | 0.0344290 | 0.2017750 | 0.0000122 | 0.200725 | 0.017239 |
| 0.2097095 | 0.0353109 | 0.2116798 | 0.0003505 | 0.210685 | 0.017829 |
| 0.2197266 | 0.0360932 | 0.2215824 | 0.0006622 | 0.220644 | 0.018376 |
| 0.2297441 | 0.0368232 | 0.2314867 | 0.0009523 | 0.230604 | 0.018886 |
| 0.2397606 | 0.0375028 | 0.2413922 | 0.0012248 | 0.240564 | 0.019362 |
| 0.2597939 | 0.0387085 | 0.2612125 | 0.0017112 | 0.260489 | 0.020208 |
| 0.2698109 | 0.0392440 | 0.2711275 | 0.0019299 | 0.270454 | 0.020585 |
| 0.2798264 | 0.0397331 | 0.2810437 | 0.0021348 | 0.280419 | 0.020932 |
| 0.2898420 | 0.0401799 | 0.2909620 | 0.0023241 | 0.290385 | 0.021250 |
| 0.2998568 | 0.0405874 | 0.3008811 | 0.0025026 | 0.300351 | 0.021543 |
| 0.3098719 | 0.0409537 | 0.3108039 | 0.0026664 | 0.310319 | 0.021808 |
| 0.3198867 | 0.0412828 | 0.3207309 | 0.0028213 | 0.320289 | 0.022050 |
| 0.3299090 | 0.0415747 | 0.3306613 | 0.0029635 | 0.330260 | 0.022267 |
| 0.3399135 | 0.0418355 | 0.3405959 | 0.0031007 | 0.340233 | 0.022466 |
| 0.3599383 | 0.0422538 | 0.3604727 | 0.0033465 | 0.360182 | 0.022798 |
| 0.3699499 | 0.0424175 | 0.3704129 | 0.0034608 | 0.370157 | 0.022937 |
| 0.3799623 | 0.0425472 | 0.3803526 | 0.0035691 | 0.380132 | 0.023056 |
| 0.3899747 | 0.0426480 | 0.3902919 | 0.0036763 | 0.390107 | 0.023160 |
| 0.3999873 | 0.0427139 | 0.4002353 | 0.0037784 | 0.400084 | 0.023244 |
| 0.4099979 | 0.0427479 | 0.4101825 | 0.0038785 | 0.410062 | 0.023311 |
| 0.4200087 | 0.0427530 | 0.4201335 | 0.0039794 | 0.420042 | 0.023364 |
| 0.4300188 | 0.0427252 | 0.4300852 | 0.0040792 | 0.430022 | 0.023400 |
| 0.4400298 | 0.0426675 | 0.4400381 | 0.0041789 | 0.440003 | 0.023421 |
| 0.4600501 | 0.0424704 | 0.4599475 | 0.0043799 | 0.459966 | 0.023423 |
| 0.4700599 | 0.0423292 | 0.4699057 | 0.0044791 | 0.469949 | 0.023402 |
| 0.4800687 | 0.0421621 | 0.4798667 | 0.0045802 | 0.479933 | 0.023369 |
| 0.4900768 | 0.0419652 | 0.4898304 | 0.0046791 | 0.489918 | 0.023320 |
| 0.5000857 | 0.0417456 | 0.4997954 | 0.0047828 | 0.499904 | 0.023262 |
| 0.5100949 | 0.0414999 | 0.5097601 | 0.0048844 | 0.509890 | 0.023190 |
| 0.5201036 | 0.0412294 | 0.5197232 | 0.0049889 | 0.519875 | 0.023107 |
| 0.5301136 | 0.0409331 | 0.5296870 | 0.0050932 | 0.529861 | 0.023011 |
| 0.5401226 | 0.0406111 | 0.5396500 | 0.0051991 | 0.539846 | 0.022903 |
| 0.5601419 | 0.0398824 | 0.5595785 | 0.0054058 | 0.559818 | 0.022642 |
| 0.5701513 | 0.0394803 | 0.5695429 | 0.0055098 | 0.569804 | 0.022493 |
| 0.5801612 | 0.0390429 | 0.5795047 | 0.0056093 | 0.579789 | 0.022324 |
| 0.5901735 | 0.0385818 | 0.5894604 | 0.0057123 | 0.589772 | 0.022145 |
| 0.6001860 | 0.0380847 | 0.5994118 | 0.0058094 | 0.599753 | 0.021945 |
| 0.6101955 | 0.0375531 | 0.6093721 | 0.0058990 | 0.609737 | 0.021724 |
| 0.6202039 | 0.0369907 | 0.6193395 | 0.0059813 | 0.619724 | 0.021484 |
| 0.6302121 | 0.0363964 | 0.6293072 | 0.0060536 | 0.629711 | 0.021223 |
| 0.6402199 | 0.0357781 | 0.6392753 | 0.0061198 | 0.639698 | 0.020947 |
| 0.6602342 | 0.0344637 | 0.6592168 | 0.0062081 | 0.659674 | 0.020334 |
| 0.6702400 | 0.0337710 | 0.6691888 | 0.0062287 | 0.669662 | 0.019998 |
| 0.6802461 | 0.0330546 | 0.6791585 | 0.0062311 | 0.679649 | 0.019641 |
| 0.6902521 | 0.0323168 | 0.6891264 | 0.0062168 | 0.689635 | 0.019265 |
| 0.7002576 | 0.0315504 | 0.6990988 | 0.0061791 | 0.699623 | 0.018863 |
| 0.7102602 | 0.0307594 | 0.7090781 | 0.0061200 | 0.709613 | 0.018438 |
| 0.7302602 | 0.0291037 | 0.7290578 | 0.0059375 | 0.729601 | 0.017519 |
| 0.7402577 | 0.0282411 | 0.7390561 | 0.0058141 | 0.739598 | 0.017026 |
| 0.7602484 | 0.0264685 | 0.7590631 | 0.0055205 | 0.759595 | 0.015993 |
| 0.7702422 | 0.0255592 | 0.7690713 | 0.0053497 | 0.769595 | 0.015453 |
| 0.7802355 | 0.0246354 | 0.7790838 | 0.0051654 | 0.779597 | 0.014899 |
| 0.7902269 | 0.0236986 | 0.7891003 | 0.0049680 | 0.789600 | 0.014332 |
| 0.8002178 | 0.0227487 | 0.7991213 | 0.0047599 | 0.799605 | 0.013753 |
| 0.8102075 | 0.0217895 | 0.8091434 | 0.0045409 | 0.809610 | 0.013164 |
| 0.8201968 | 0.0208228 | 0.8191659 | 0.0043156 | 0.819615 | 0.012568 |

30 Airfoil Section

| Thickness | | | | Camber | |
|---|---|---|---|---|---|
| Upper | | Lower | | | |
| x/c | | y/c | | x/c | t/c |
| 0.8401769 | 0.0188684 | 0.8392137 | 0.0038437 | 0.839627 | 0.011355 |
| 0.8601563 | 0.0168837 | 0.8592619 | 0.0033362 | 0.859639 | 0.010109 |
| 0.8701466 | 0.0158813 | 0.8692875 | 0.0030684 | 0.869646 | 0.009474 |
| | | | | 0.879563 | 0.008829 |
| 0.8801368 | 0.0148720 | 0.8793131 | 0.0027877 | 0.889660 | 0.008175 |
| 0.8901273 | 0.0138565 | 0.8893386 | 0.0024950 | 0.899666 | 0.007510 |
| 0.9001167 | 0.0128329 | 0.8993630 | 0.0021885 | 0.909673 | 0.006834 |
| 0.9101071 | 0.0118011 | 0.9093885 | 0.0018682 | 0.919679 | 0.006145 |
| 0.9200958 | 0.0107584 | 0.9194136 | 0.0015327 | 0.929686 | 0.005440 |
| 0.9300850 | 0.0097006 | 0.9294403 | 0.0011805 | 0.939692 | 0.004722 |
| 0.9400727 | 0.0086300 | 0.9394665 | 0.0008148 | 0.959704 | 0.003235 |
| 0.9600461 | 0.0064443 | 0.9595208 | 0.0000263 | 0.969711 | 0.002464 |
| 0.9700327 | 0.0053303 | 0.9695501— | 0.0004018 | 0.979720 | 0.001673 |
| 0.9800202 | 0.0042054 | 0.9795824— | 0.0008591 | 0.989731 | 0.000858 |
| 0.9900089 | 0.0030697 | 0.9896176— | 0.0013535 | 0.999745 | 0.000021 |

57 Airfoil Section

| Thickness | | | | Camber | |
|---|---|---|---|---|---|
| Upper | | Lower | | | |
| x/c | | y/c | | x/c | t/c |
| 0.0000000 | 0.0000000 | 0.0000000 | 0.0000000 | 0.000010 | 0.0 |
| 0.0000021 | 0.0000484 | 0.0000199— | 0.0000424 | 0.000021 | 0.000003 |
| 0.0003926 | 0.0015291 | 0.0008955— | 0.0012531 | 0.000654 | 0.000138 |
| 0.0008499 | 0.0022307 | 0.0015382— | 0.0017447 | 0.001204 | 0.000243 |
| 0.0018004 | 0.0032717 | 0.0027177— | 0.0024036 | 0.002269 | 0.000434 |
| 0.0027647 | 0.0041338 | 0.0038393— | 0.0029178 | 0.003312 | 0.000608 |
| 0.0047107 | 0.0055932 | 0.0060035— | 0.0037552 | 0.005367 | 0.000919 |
| 0.0071608 | 0.0071181 | 0.0086375— | 0.0045840 | 0.007909 | 0.001267 |
| 0.0096219 | 0.0084285 | 0.0112363— | 0.0052645 | 0.010439 | 0.001582 |
| 0.0195114 | 0.0125532 | 0.0215072— | 0.0071971 | 0.020519 | 0.002678 |
| 0.0294290 | 0.0157229 | 0.0317058— | 0.0084328 | 0.030577 | 0.003645 |
| 0.0393590 | 0.0183571 | 0.0418801— | 0.0092370 | 0.040629 | 0.004560 |
| 0.0592451 | 0.0227245 | 0.0621786— | 0.0100483 | 0.060721 | 0.006338 |
| 0.0691988 | 0.0246276 | 0.0723031— | 0.0101954 | 0.070760 | 0.007216 |
| 0.0791621 | 0.0264055 | 0.0824041— | 0.0102273 | 0.080792 | 0.008089 |
| 0.0891339 | 0.0280899 | 0.0924764— | 0.0101797 | 0.090814 | 0.008955 |
| 0.0991161 | 0.0296942 | 0.1025225— | 0.0100800 | 0.100828 | 0.009807 |
| 0.1091049 | 0.0312285 | 0.1125481— | 0.0099422 | 0.110835 | 0.010643 |
| 0.1190964 | 0.0326940 | 0.1225648— | 0.0097797 | 0.120839 | 0.011457 |
| 0.1290897 | 0.0340972 | 0.1325798— | 0.0095908 | 0.130843 | 0.012253 |
| 0.1390848 | 0.0354471 | 0.1425890— | 0.0093787 | 0.140845 | 0.013034 |
| 0.1590902 | 0.0379853 | 0.1625601— | 0.0089129 | 0.160833 | 0.014536 |
| 0.1691040 | 0.0391799 | 0.1725166— | 0.0086635 | 0.170818 | 0.015258 |
| 0.1791260 | 0.0403183 | 0.1824468— | 0.0084159 | 0.180794 | 0.015951 |
| 0.1891581 | 0.0413972 | 0.1923530— | 0.0081727 | 0.190763 | 0.016612 |
| 0.1991960 | 0.0424173 | 0.2022395— | 0.0079389 | 0.200725 | 0.017239 |
| 0.2092381 | 0.0433748 | 0.2121176— | 0.0077163 | 0.210685 | 0.017829 |
| 0.2192810 | 0.0442660 | 0.2219930— | 0.0075135 | 0.220644 | 0.018376 |
| 0.2293239 | 0.0450967 | 0.2318704— | 0.0073242 | 0.230604 | 0.018886 |
| 0.2393650 | 0.0458709 | 0.2417495— | 0.0071464 | 0.240564 | 0.019362 |
| 0.2594460 | 0.0472427 | 0.2615191— | 0.0068261 | 0.260489 | 0.020208 |
| 0.2694856 | 0.0478502 | 0.2714097— | 0.0066796 | 0.270454 | 0.020585 |
| 0.2795233 | 0.0484066 | 0.2813023— | 0.0065420 | 0.280419 | 0.020932 |
| 0.2895606 | 0.0489116 | 0.2911973— | 0.0064110 | 0.290385 | 0.021250 |
| 0.2995966 | 0.0493722 | 0.3010936— | 0.0062856 | 0.300351 | 0.021543 |
| 0.3096322 | 0.0497844 | 0.3109943— | 0.0061678 | 0.310319 | 0.021808 |
| 0.3196664 | 0.0501545 | 0.3209003— | 0.0060539 | 0.320289 | 0.022050 |
| 0.3296983 | 0.0504810 | 0.3308107— | 0.0059464 | 0.330260 | 0.022267 |
| 0.3397291 | 0.0507698 | 0.3407263— | 0.0058372 | 0.340233 | 0.022466 |
| 0.3597864 | 0.0512284 | 0.3605675— | 0.0056317 | 0.360182 | 0.022798 |
| 0.3698138 | 0.0514025 | 0.3704904— | 0.0055279 | 0.370157 | 0.022937 |
| 0.3798421 | 0.0515372 | 0.3804123— | 0.0054245 | 0.380132 | 0.023056 |
| 0.3903341 | 0.0053167 | 0.390107 | 0.023160 | 0.3898720 | 0.0516373 |
| 0.4002607— | 0.0052067 | 0.400084 | 0.023244 | 0.3998983 | 0.0516953 |
| 0.4101925— | 0.0050914 | 0.410062 | 0.023311 | 0.4099228 | 0.0517141 |
| 0.4201289— | 0.0049671 | 0.420042 | 0.023364 | 0.4199465 | 0.0516958 |
| 0.4300664— | 0.0048383 | 0.430022 | 0.023400 | 0.4299694 | 0.0516390 |
| 0.4400051— | 0.0047032 | 0.440003 | 0.023421 | 0.4399929 | 0.0515458 |
| 0.4598874— | 0.0044102 | 0.459966 | 0.023423 | 0.4600374 | 0.0512569 |
| 0.4698328— | 0.0042547 | 0.469949 | 0.023402 | 0.4700581 | 0.0510593 |
| 0.4797820— | 0.0040918 | 0.479933 | 0.023369 | 0.4800771 | 0.0508304 |
| 0.4897346— | 0.0039247 | 0.489918 | 0.023320 | 0.4900949 | 0.0505653 |
| 0.4996887— | 0.0037472 | 0.499904 | 0.023262 | 0.5001130 | 0.0502719 |

57 Airfoil Section

| Thickness | | | | Camber | |
|---|---|---|---|---|---|
| Upper | | Lower | | | |
| x/c | | y/c | | x/c | t/c |
| 0.5096424— | 0.0035646 | 0.509890 | 0.023190 | 0.5101317 | 0.0499452 |
| 0.5195942— | 0.0033736 | 0.519875 | 0.023107 | 0.5201501 | 0.0495883 |
| 0.5295466— | 0.0031765 | 0.529861 | 0.023011 | 0.5301700 | 0.0491991 |
| 0.5394980— | 0.0029723 | 0.539846 | 0.022903 | 0.5401888 | 0.0487789 |
| 0.5594041— | 0.0025510 | 0.559818 | 0.022642 | 0.5602274 | 0.0478356 |
| 0.5693573— | 0.0023289 | 0.569804 | 0.022493 | 0.5702464 | 0.0473155 |
| 0.5793072— | 0.0021065 | 0.579789 | 0.022324 | 0.5802667 | 0.0467551 |
| 0.5892491— | 0.0018733 | 0.589772 | 0.022145 | 0.5902911 | 0.0461639 |
| 0.5991856— | 0.0016385 | 0.599753 | 0.021945 | 0.6003169 | 0.0455292 |
| 0.6091337— | 0.0014052 | 0.609737 | 0.021724 | 0.6103370 | 0.0448538 |
| 0.6190909— | 0.0011742 | 0.619724 | 0.021484 | 0.6203542 | 0.0441428 |
| 0.6290484— | 0.0009487 | 0.629711 | 0.021223 | 0.6303709 | 0.0433953 |
| 0.6390065— | 0.0007252 | 0.639698 | 0.020947 | 0.6403872 | 0.0426198 |
| 0.6589297— | 0.0003125 | 0.659674 | 0.020334 | 0.6604164 | 0.0409810 |
| 0.6688931— | 0.0001271 | 0.669662 | 0.019998 | 0.6704294 | 0.0401237 |
| 0.6788537 | 0.0000415 | 0.679649 | 0.019641 | 0.6804430 | 0.0392411 |
| 0.6888119 | 0.0001941 | 0.689635 | 0.019265 | 0.6904570 | 0.0383364 |
| 0.7087491 | 0.0004336 | 0.709613 | 0.018438 | 0.7104765 | 0.0364429 |
| 0.7287225 | 0.0005919 | 0.729601 | 0.017519 | 0.7304797 | 0.0344466 |
| 0.7387202 | 0.0006389 | 0.739598 | 0.017026 | 0.7404761 | 0.0334136 |
| 0.7587293 | 0.0006861 | 0.759595 | 0.015993 | 0.7604616 | 0.0313004 |
| 0.7687401 | 0.0006868 | 0.769595 | 0.015453 | 0.7704512 | 0.0302196 |
| 0.7787563 | 0.0006730 | 0.779597 | 0.014899 | 0.7804392 | 0.0291254 |
| 0.7887776 | 0.0006453 | 0.789600 | 0.014332 | 0.7904242 | 0.0280191 |
| 0.7988048 | 0.0006079 | 0.799605 | 0.013753 | 0.8004074 | 0.0268984 |
| 0.8088336 | 0.0005608 | 0.809610 | 0.013164 | 0.8103887 | 0.0257675 |
| 0.8188631 | 0.0005066 | 0.819615 | 0.012568 | 0.8203695 | 0.0246297 |
| 0.8389248 | 0.0003768 | 0.839627 | 0.011355 | 0.8403324 | 0.0223335 |
| 0.8589874 | 0.0002102 | 0.859639 | 0.010109 | 0.8602943 | 0.0200080 |
| | | | | 0.869646 | 0.009474 |
| 0.8702759 | 0.0188367 | 0.8690202 | 0.0001116 | 0.879653 | 0.008829 |
| 0.8802571 | 0.0176592 | 0.8790532 | 0.0000009 | 0.889660 | 0.008175 |
| 0.8902386 | 0.0164768 | 0.8890860— | 0.0001265 | 0.899666 | 0.007510 |
| 0.9002185 | 0.0152885 | 0.8991176— | 0.0002683 | 0.909673 | 0.006834 |
| 0.9102007 | 0.0140924 | 0.9091504— | 0.0004242 | 0.919679 | 0.006145 |
| 0.9201802 | 0.0128868 | 0.9191832— | 0.0005966 | 0.929686 | 0.005440 |
| 0.9301599 | 0.0116654 | 0.9292178— | 0.0007852 | 0.939692 | 0.004722 |
| 0.9401379 | 0.0104323 | 0.9392521— | 0.0009882 | 0.959704 | 0.003235 |
| 0.9600911 | 0.0079252 | 0.9593233— | 0.0014551 | 0.969711 | 0.002464 |
| 0.9700670 | 0.0066525 | 0.9693618— | 0.0017244 | 0.979720 | 0.001673 |
| 0.9800434 | 0.0053728 | 0.9794037— | 0.0020267 | 0.989731 | 0.000858 |
| 0.9900205 | 0.0040897 | 0.9894488— | 0.0023737 | 0.999745 | 0.000021 |
| 1.0000000 | 0.0028162 | 1.0000000— | 0.0027956 | | |

85 Airfoil Section

| Thickness | | | | Camber | |
|---|---|---|---|---|---|
| Upper | | Lower | | | |
| x/c | | y/c | | x/c | t/c |
| 0.0000000 | 0.0000707 | 0.0000000 | 0.0000707 | 0.000010 | 0.0 |
| 0.0002713 | 0.0022125 | 0.0000023 | 0.0000000 | 0.000021 | 0.000003 |
| 0.0006830 | 0.0032069 | 0.0000267— | 0.0000647 | 0.000654 | 0.000138 |
| 0.0015773 | 0.0046644 | 0.0010213— | 0.0019365 | 0.001204 | 0.000243 |
| 0.0025027 | 0.0058657 | 0.0017094— | 0.0027209 | 0.002269 | 0.000434 |
| 0.0043949 | 0.0078880 | 0.0029448— | 0.0037965 | 0.003312 | 0.000608 |
| 0.0067995 | 0.0099910 | 0.0041052— | 0.0046499 | 0.005367 | 0.000919 |
| 0.0092266 | 0.0117901 | 0.0063225— | 0.0060502 | 0.007909 | 0.001267 |
| 0.0190212 | 0.0174009 | 0.0090013— | 0.0074573 | 0.010439 | 0.001582 |
| 0.0288684 | 0.0216536 | 0.0116337— | 0.0086264 | 0.020519 | 0.002678 |
| 0.0387373 | 0.0251319 | 0.0219969— | 0.0120455 | 0.030577 | 0.003645 |
| 0.0585195 | 0.0307705 | 0.0322634— | 0.0143644 | 0.040629 | 0.004560 |
| 0.0684301 | 0.0331765 | 0.0424963— | 0.0160129 | 0.060721 | 0.006338 |
| 0.0783583 | 0.0353982 | 0.0628936— | 0.0180989 | 0.070760 | 0.007216 |
| 0.0883042 | 0.0374850 | 0.0730587— | 0.0187461 | 0.080792 | 0.008089 |
| 0.0982695 | 0.0394587 | 0.0831922— | 0.0192221 | 0.090814 | 0.008955 |
| 0.1082479 | 0.0413361 | 0.0932881— | 0.0195770 | 0.100828 | 0.009807 |
| 0.1182320 | 0.0431211 | 0.1033486— | 0.0198468 | 0.110835 | 0.010643 |
| 0.1282185 | 0.0448225 | 0.1133819— | 0.0200524 | 0.120839 | 0.011457 |
| 0.1382090 | 0.0464515 | 0.1234035— | 0.0202097 | 0.130843 | 0.012253 |
| 0.1582203 | 0.0494991 | 0.1334227— | 0.0203193 | 0.140845 | 0.013034 |
| 0.1682470 | 0.0509250 | 0.1434340— | 0.0203864 | 0.160833 | 0.014536 |
| 0.1782904 | 0.0522810 | 0.1633943— | 0.0204303 | 0.170818 | 0.015258 |
| 0.1883521 | 0.0535658 | 0.1733354— | 0.0204125 | 0.180794 | 0.015951 |
| 0.1984259 | 0.0547778 | 0.1832418— | 0.0203826 | 0.190763 | 0.016612 |

-continued

85 Airfoil Section

| Thickness | | | | Camber | |
|---|---|---|---|---|---|
| Upper | | Lower | | | |
| x/c | | y/c | | x/c | t/c |
| 0.2085070 | 0.0559169 | 0.1931158— | 0.0203455 | 0.200725 | 0.017239 |
| 0.2185897 | 0.0569777 | 0.2029639— | 0.0203036 | 0.210685 | 0.017829 |
| 0.2286720 | 0.0579652 | 0.2128005— | 0.0202628 | 0.220644 | 0.018376 |
| 0.2387518 | 0.0588844 | 0.2226336— | 0.0202298 | 0.230604 | 0.018886 |
| 0.2589065 | 0.0605162 | 0.2324690— | 0.0201974 | 0.240564 | 0.019362 |
| 0.2689816 | 0.0612362 | 0.2423071— | 0.0201648 | 0.260489 | 0.020208 |
| 0.2790536 | 0.0618947 | 0.2619978— | 0.0201047 | 0.270454 | 0.020585 |
| 0.2891246 | 0.0624924 | 0.2718506— | 0.0200708 | 0.280419 | 0.020932 |
| 0.2991937 | 0.0630347 | 0.2817063— | 0.0200354 | 0.290385 | 0.021250 |
| 0.3092612 | 0.0635193 | 0.2915651— | 0.0199972 | 0.300351 | 0.021543 |
| 0.3193257 | 0.0639531 | 0.3014258— | 0.0199535 | 0.310319 | 0.021808 |
| 0.3293861 | 0.0643322 | 0.3112921— | 0.0199082 | 0.320289 | 0.022050 |
| 0.3394439 | 0.0646657 | 0.3211654— | 0.0198580 | 0.330260 | 0.022267 |
| 0.3595518 | 0.0651857 | 0.3310447— | 0.0198032 | 0.340233 | 0.022466 |
| 0.3696036 | 0.0653774 | 0.3409307— | 0.0197388 | 0.360182 | 0.022798 |
| 0.3796567 | 0.0655198 | 0.3607163— | 0.0195949 | 0.370157 | 0.022937 |
| 0.3897101 | 0.0656178 | 0.3706124— | 0.0195086 | 0.380132 | 0.023056 |
| 0.3997614 | 0.0656633 | 0.3805070— | 0.0194129 | 0.390107 | 0.023160 |
| 0.4098074 | 0.0656585 | 0.3904013— | 0.0193030 | 0.400084 | 0.023244 |
| 0.4198514 | 0.0656049 | 0.4003018— | 0.0191805 | 0.410062 | 0.023311 |
| 0.4298940 | 0.0655029 | 0.4102097— | 0.0190417 | 0.420042 | 0.023364 |
| 0.4399371 | 0.0653535 | 0.4201234— | 0.0188822 | 0.430022 | 0.023400 |
| 0.4600187 | 0.0649217 | 0.4300386— | 0.0187082 | 0.440003 | 0.023421 |
| 0.4700568 | 0.0646377 | 0.4399552— | 0.0185167 | 0.459966 | 0.023423 |
| 0.4800918 | 0.0643116 | 0.4597952— | 0.0180810 | 0.469949 | 0.023402 |
| 0.4901242 | 0.0639414 | 0.4697208— | 0.0178390 | 0.479933 | 0.023369 |
| 0.5001567 | 0.0635321 | 0.4796517— | 0.0175789 | 0.489918 | 0.023320 |
| 0.5101902 | 0.0630807 | 0.4895870— | 0.0173067 | 0.499904 | 0.023262 |
| 0.5202237 | 0.0625891 | 0.4995242— | 0.0170133 | 0.509890 | 0.023190 |
| 0.5302589 | 0.0620557 | 0.5094606— | 0.0167059 | 0.519875 | 0.023107 |
| 0.5402930 | 0.0614816 | 0.5193948— | 0.0163804 | 0.529861 | 0.023011 |
| 0.5603617 | 0.0602035 | 0.5293294— | 0.0160388 | 0.539846 | 0.022903 |
| 0.5703956 | 0.0595011 | 0.5392630— | 0.0156807 | 0.559818 | 0.022642 |
| 0.5804319 | 0.0587492 | 0.5591340— | 0.0149245 | 0.569804 | 0.022493 |
| 0.5904754 | 0.0579555 | 0.5690698— | 0.0145201 | 0.579789 | 0.022324 |
| 0.6005218 | 0.0571070 | 0.5790012— | 0.0141062 | 0.589772 | 0.022145 |
| 0.6105583 | 0.0562083 | 0.5889215— | 0.0136705 | 0.599753 | 0.021945 |
| 0.6205889 | 0.0552660 | 0.5988349— | 0.0132219 | 0.609737 | 0.021724 |
| 0.6306189 | 0.0542799 | 0.6087642— | 0.0127651 | 0.619724 | 0.021484 |
| 0.6406482 | 0.0532590 | 0.6187053— | 0.0123028 | 0.629711 | 0.021223 |
| 0.6607011 | 0.0511167 | 0.6286471— | 0.0118387 | 0.639698 | 0.020947 |
| 0.6707248 | 0.0500026 | 0.6385896— | 0.0113697 | 0.659674 | 0.020334 |
| 0.6807504 | 0.0488627 | 0.6584842— | 0.0104532 | 0.669662 | 0.019998 |
| 0.6907768 | 0.0476995 | 0.6684343— | 0.0100111 | 0.679649 | 0.019641 |
| 0.7007998 | 0.0465045 | 0.6783805— | 0.0095851 | 0.689635 | 0.019265 |
| 0.7108140 | 0.0452819 | 0.6883237— | 0.0091738 | 0.699623 | 0.018863 |
| 0.7308218 | 0.0427571 | 0.6982746— | 0.0087827 | 0.709613 | 0.018438 |
| 0.7408168 | 0.0414590 | 0.7082382— | 0.0084101 | 0.729601 | 0.017519 |
| 0.7607940 | 0.0388152 | 0.7282019— | 0.0077230 | 0.739598 | 0.017026 |
| 0.7707772 | 0.0374689 | 0.7381986— | 0.0074108 | 0.759595 | 0.015993 |
| 0.7807569 | 0.0361093 | 0.7582110— | 0.0068327 | 0.769595 | 0.015453 |
| 0.7907315 | 0.0347372 | 0.7682257— | 0.0065663 | 0.779597 | 0.014899 |
| 0.8007028 | 0.0333515 | 0.7782477— | 0.0063146 | 0.789600 | 0.014332 |
| 0.8106714 | 0.0319553 | 0.7882768— | 0.0060764 | 0.799605 | 0.013753 |
| 0.8206389 | 0.0305515 | 0.7983133— | 0.0058486 | 0.809610 | 0.013164 |
| 0.8405750 | 0.0277225 | 0.8083525— | 0.0056303 | 0.819615 | 0.012568 |
| 0.8605097 | 0.0248672 | 0.8183927— | 0.0054183 | 0.839627 | 0.011355 |
| 0.8704774 | 0.0234329 | 0.8384762— | 0.0050150 | 0.859639 | 0.010109 |
| 0.8804446 | 0.0219941 | 0.8585610— | 0.0046515 | 0.869646 | 0.009474 |
| 0.8904123 | 0.0205528 | 0.8686051— | 0.0044871 | 0.879653 | 0.008829 |
| 0.9003792 | 0.0191074 | 0.8786496— | 0.0043380 | 0.889660 | 0.008175 |
| 0.9103467 | 0.0176563 | 0.8886937— | 0.0042047 | 0.899666 | 0.007510 |
| 0.9203119 | 0.0161957 | 0.8987365— | 0.0040891 | 0.909673 | 0.006834 |
| 0.9302769 | 0.0147212 | 0.9087807— | 0.0039898 | 0.919679 | 0.006145 |
| 0.9402398 | 0.0132363 | 0.9188254— | 0.0039071 | 0.929686 | 0.005440 |
| 0.9601615 | 0.0102273 | 0.9288722— | 0.0038425 | 0.939692 | 0.004722 |
| 0.9701207 | 0.0087089 | 0.9389190— | 0.0037934 | 0.959704 | 0.003235 |
| 0.9800799 | 0.0071895 | 0.9590168— | 0.0037580 | 0.969711 | 0.002464 |
| 0.9900390 | 0.0056761 | 0.9690694— | 0.0037815 | 0.979720 | 0.001673 |
| 1.0000000 | 0.0041885 | 0.9791260— | 0.0038439 | 0.989731 | 0.000858 |
| | | 0.9891867— | 0.0039603 | | |
| | | 1.0000000— | 0.0041632 | | |

136 Airfoil Section

| Thickness | | | | Camber | |
|---|---|---|---|---|---|
| Upper | | Lower | | | |
| x/c | | y/c | | x/c | t/c |
| 0.0000000 | 0.0001115 | 0.0000000 | 0.0001115 | 0.000010 | 0.0 |
| 0.0002460 | 0.0034410 | 0.0000033 | 0.0000000 | 0.000021 | 0.000002 |
| 0.0006482 | 0.0049432 | 0.0000285— | 0.0001075 | 0.000654 | 0.000092 |
| 0.0015309 | 0.0071066 | 0.0010604— | 0.0032570 | 0.001204 | 0.000162 |
| 0.0024484 | 0.0088712 | 0.0017460— | 0.0046192 | 0.002269 | 0.000289 |
| 0.0043297 | 0.0118222 | 0.0029931— | 0.0065287 | 0.003312 | 0.000405 |
| 0.0067252 | 0.0148642 | 0.0041613— | 0.0080613 | 0.005367 | 0.000613 |
| 0.0091454 | 0.0174502 | 0.0063893— | 0.0105964 | 0.007909 | 0.000845 |
| 0.0189209 | 0.0254085 | 0.0090771— | 0.0131744 | 0.010439 | 0.001055 |
| 0.0287540 | 0.0313142 | 0.0117162— | 0.0153405 | 0.020519 | 0.001785 |
| 0.0386104 | 0.0360309 | 0.0220980— | 0.0218390 | 0.030577 | 0.002430 |
| 0.0583714 | 0.0434031 | 0.0323781— | 0.0264548 | 0.040629 | 0.003040 |
| 0.0682731 | 0.0464388 | 0.0426230— | 0.0299517 | 0.060721 | 0.004225 |
| 0.0781942 | 0.0491827 | 0.0630404— | 0.0349543 | 0.070760 | 0.004811 |
| 0.0881349 | 0.0517137 | 0.0732139— | 0.0368181 | 0.080792 | 0.005393 |
| 0.0980967 | 0.0540771 | 0.0833540— | 0.0383982 | 0.090814 | 0.005970 |
| 0.1080731 | 0.0562991 | 0.0934545— | 0.0397754 | 0.100828 | 0.006538 |
| 0.1180558 | 0.0583935 | 0.1035179— | 0.0410029 | 0.110835 | 0.007095 |
| 0.1280411 | 0.0603719 | 0.1135529— | 0.0421110 | 0.120839 | 0.007638 |
| 0.1380296 | 0.0622476 | 0.1235754— | 0.0431196 | 0.130843 | 0.008169 |
| 0.1580433 | 0.0657161 | 0.1335953— | 0.0440361 | 0.140845 | 0.008689 |
| 0.1680726 | 0.0673200 | 0.1436071— | 0.0448720 | 0.160833 | 0.009691 |
| 0.1781205 | 0.0688371 | 0.1635649— | 0.0463369 | 0.170818 | 0.010172 |
| 0.1881884 | 0.0702684 | 0.1735029— | 0.0469789 | 0.180794 | 0.010634 |
| 0.1982697 | 0.0716162 | 0.1834043— | 0.0475721 | 0.190763 | 0.011075 |
| 0.2083588 | 0.0728803 | 0.1932716— | 0.0481215 | 0.200725 | 0.011493 |
| 0.2184497 | 0.0740604 | 0.2031117— | 0.0486334 | 0.210685 | 0.011886 |
| 0.2285401 | 0.0751587 | 0.2129397— | 0.0491115 | 0.220644 | 0.012251 |
| 0.2386277 | 0.0761796 | 0.2227641— | 0.0495618 | 0.230604 | 0.012591 |
| 0.2587975 | 0.0779907 | 0.2325910— | 0.0499802 | 0.240564 | 0.021908 |
| 0.2688798 | 0.0787879 | 0.2424207— | 0.0503672 | 0.260489 | 0.013472 |
| 0.2789589 | 0.0795139 | 0.2620953— | 0.0510504 | 0.270454 | 0.013723 |
| 0.2890367 | 0.0801706 | 0.2719404— | 0.0513457 | 0.280419 | 0.013945 |
| 0.2991124 | 0.0807620 | 0.2817885— | 0.0516078 | 0.290385 | 0.014167 |
| 0.3091864 | 0.0812886 | 0.2916400— | 0.0518406 | 0.300351 | 0.014362 |
| 0.3192570 | 0.0817537 | 0.3014935— | 0.0520420 | 0.310319 | 0.014539 |
| 0.3293233 | 0.0821566 | 0.3113528— | 0.0522147 | 0.320289 | 0.014700 |
| 0.3393866 | 0.0825025 | 0.3212194— | 0.0523578 | 0.330260 | 0.014845 |
| 0.3595046 | 0.0830228 | 0.3310924— | 0.0524708 | 0.340233 | 0.014977 |
| 0.3695613 | 0.0831988 | 0.3409725— | 0.0525527 | 0.360182 | 0.015199 |
| 0.3796195 | 0.0833157 | 0.3607468— | 0.0526290 | 0.370157 | 0.015291 |
| 0.3896780 | 0.0833738 | 0.3706375— | 0.0526210 | 0.380132 | 0.015371 |
| 0.3997341 | 0.0833673 | 0.3805265— | 0.0525780 | 0.390107 | 0.015440 |
| 0.4097844 | 0.0832967 | 0.3904153— | 0.0524982 | 0.400084 | 0.015496 |
| 0.4198324 | 0.0831622 | 0.4003105— | 0.0523797 | 0.410062 | 0.015541 |
| 0.4298790 | 0.0829651 | 0.4102134— | 0.0522190 | 0.420042 | 0.015576 |
| 0.4399260 | 0.0827057 | 0.4201226— | 0.0520145 | 0.430022 | 0.015600 |
| 0.4600154 | 0.0820126 | 0.4300333— | 0.0517694 | 0.440003 | 0.015614 |
| 0.4700504 | 0.0815793 | 0.4399455— | 0.0514820 | 0.459966 | 0.015615 |
| 0.4800950 | 0.0810882 | 0.4597768— | 0.0507869 | 0.469949 | 0.015601 |
| 0.4901304 | 0.0805421 | 0.4696985— | 0.0503812 | 0.479933 | 0.015579 |
| 0.5001659 | 0.0799407 | 0.4796256— | 0.0499345 | 0.489918 | 0.015547 |
| 0.5102024 | 0.0792867 | 0.4895574— | 0.0494525 | 0.499904 | 0.015508 |
| 0.5202389 | 0.0785788 | 0.4994913— | 0.0489290 | 0.509890 | 0.015460 |
| 0.5302772 | 0.0778155 | 0.5094240— | 0.0483710 | 0.519875 | 0.015405 |
| 0.5403145 | 0.0769984 | 0.5193547— | 0.0477731 | 0.529861 | 0.015341 |
| 0.5603891 | 0.0751975 | 0.5292857— | 0.0471378 | 0.539846 | 0.015269 |
| 0.5704260 | 0.0742138 | 0.5392157— | 0.0464646 | 0.559818 | 0.015095 |
| 0.5804656 | 0.0731695 | 0.5590796— | 0.0450121 | 0.569804 | 0.014995 |
| 0.5905130 | 0.0720673 | 0.5690119— | 0.0442279 | 0.579789 | 0.014883 |
| 0.6005636 | 0.0708989 | 0.5789396— | 0.0434076 | 0.589772 | 0.014763 |
| 0.6106034 | 0.0696691 | 0.5888554— | 0.0425454 | 0.599753 | 0.014630 |
| 0.6206368 | 0.0683867 | 0.5987642— | 0.0416430 | 0.609737 | 0.014483 |
| 0.6306694 | 0.0670535 | 0.6086895— | 0.0407072 | 0.619724 | 0.014323 |
| 0.6407014 | 0.0656786 | 0.6186274— | 0.0397447 | 0.629711 | 0.014149 |
| 0.6607590 | 0.0628266 | 0.6285660— | 0.0387594 | 0.639698 | 0.013965 |
| 0.6707851 | 0.0613596 | 0.6385054— | 0.0377525 | 0.659674 | 0.013556 |
| 0.6808130 | 0.0598707 | 0.6583942— | 0.0357183 | 0.669662 | 0.013332 |
| 0.6908420 | 0.0583623 | 0.6683415— | 0.0346993 | 0.679649 | 0.013094 |
| 0.7008672 | 0.0568272 | 0.6782848— | 0.0336863 | 0.689635 | 0.012843 |
| 0.7108828 | 0.0552698 | 0.6882250— | 0.0326798 | 0.699623 | 0.012575 |
| 0.7308918 | 0.0520906 | 0.6981731— | 0.0316806 | 0.709613 | 0.012292 |
| 0.7408863 | 0.0504752 | 0.7081348— | 0.0306892 | 0.729601 | 0.011679 |
| 0.7608618 | 0.0472100 | 0.7280964— | 0.0287359 | 0.739598 | 0.011351 |
| 0.7708437 | 0.0455610 | 0.7380930— | 0.0277763 | 0.759595 | 0.010662 |
| 0.7808218 | 0.0439032 | 0.7581059— | 0.0258889 | 0.769595 | 0.010302 |
| 0.7907945 | 0.0422365 | 0.7681214— | 0.0249599 | 0.779597 | 0.009933 |

136 Airfoil Section

| Thickness | | | | Camber | |
|---|---|---|---|---|---|
| Upper x/c | | Lower y/c | | x/c | t/c |
| 0.8007632 | 0.0405587 | 0.7781445− | 0.0240399 | 0.789600 | 0.009555 |
| 0.8107292 | 0.0388741 | 0.7881752− | 0.0231291 | 0.799605 | 0.009169 |
| 0.8206941 | 0.0371843 | 0.7982137− | 0.0222232 | 0.809610 | 0.008776 |
| 0.8406247 | 0.0337884 | 0.8082549− | 0.0213245 | 0.819615 | 0.008379 |
| 0.8605539 | 0.0303814 | 0.8182973− | 0.0204286 | 0.839627 | 0.007570 |
| 0.8705187 | 0.0286784 | 0.8383852− | 0.0186505 | 0.859639 | 0.006739 |
| 0.8804832 | 0.0269775 | 0.8584745− | 0.0169053 | 0.869646 | 0.006316 |
| 0.8904480 | 0.0252810 | 0.8685209− | 0.0160481 | 0.879653 | 0.005886 |
| 0.9004122 | 0.0235884 | 0.8785676− | 0.0152071 | 0.889660 | 0.005450 |
| 0.9103768 | 0.0218967 | 0.8886141− | 0.0143825 | 0.899666 | 0.005007 |
| 0.9203391 | 0.0202029 | 0.8986592− | 0.0135758 | 0.909673 | 0.004556 |
| 0.9303011 | 0.0185009 | 0.9087057− | 0.0127860 | 0.919679 | 0.004097 |
| 0.9402610 | 0.0167938 | 0.9187527− | 0.0120100 | 0.929686 | 0.003627 |
| 0.9601762 | 0.0133653 | 0.9288020− | 0.0112479 | 0.939692 | 0.003148 |
| 0.9701322 | 0.0116545 | 0.9388514− | 0.0104987 | 0.959704 | 0.002157 |
| 0.9800878 | 0.0099600 | 0.9589546− | 0.0090519 | 0.969711 | 0.001643 |
| 0.9900432 | 0.0082977 | 0.9690100− | 0.0083689 | 0.979720 | 0.001115 |
| 1.0000000 | 0.0066964 | 0.9790696− | 0.0077303 | 0.989731 | 0.000572 |
|  |  | 0.9891334− | 0.0071539 |  |  |
|  |  | 1.0000000− | 0.0066338 |  |  |

206 Airfoil Section

| Thickness | | | | Camber | |
|---|---|---|---|---|---|
| Upper x/c | | Lower y/c | | x/c | t/c |
| 0.0000000 | 0.0001677 | 0.0000000 | 0.0001677 | 0.000010 | 0.0 |
| 0.0000468 | 0.0051636 | 0.0000106 | 0.0000000 | 0.000021 | 0.000002 |
| 0.0003730 | 0.0074026 | 0.0000432− | 0.0001637 | 0.000654 | 0.000092 |
| 0.0011617 | 0.0106133 | 0.0012619− | 0.0049797 | 0.001204 | 0.000162 |
| 0.0020145 | 0.0132258 | 0.0020354− | 0.0070787 | 0.002269 | 0.000289 |
| 0.0038062 | 0.0175877 | 0.0033760− | 0.0100355 | 0.003312 | 0.000405 |
| 0.0061259 | 0.0220759 | 0.0046084− | 0.0124161 | 0.005367 | 0.000613 |
| 0.0084894 | 0.0258838 | 0.0069252− | 0.0163621 | 0.007909 | 0.000845 |
| 0.0181069 | 0.0375591 | 0.0096877− | 0.0203865 | 0.010439 | 0.001055 |
| 0.0278227 | 0.0461715 | 0.0123825− | 0.0237745 | 0.020519 | 0.001785 |
| 0.0375770 | 0.0530004 | 0.0229180− | 0.0339903 | 0.030577 | 0.002430 |
| 0.0571650 | 0.0635549 | 0.0333111− | 0.0413132 | 0.040629 | 0.003040 |
| 0.0669947 | 0.0678506 | 0.0436537− | 0.0469226 | 0.060721 | 0.004225 |
| 0.0768573 | 0.0717061 | 0.0642356− | 0.0551079 | 0.070760 | 0.004811 |
| 0.0867547 | 0.0752429 | 0.0744768− | 0.0582321 | 0.080792 | 0.005393 |
| 0.0966884 | 0.0785289 | 0.0846712− | 0.0609239 | 0.909814 | 0.005970 |
| 0.1066674 | 0.0816072 | 0.0948108− | 0.0633071 | 0.100828 | 0.006538 |
| 0.1166179 | 0.0845004 | 0.1048982− | 0.0654755 | 0.110835 | 0.007095 |
| 0.1265921 | 0.0872232 | 0.1149459− | 0.0674222 | 0.120839 | 0.007638 |
| 0.1365739 | 0.0897958 | 0.1249766− | 0.0692298 | 0.130843 | 0.008169 |
| 0.1565964 | 0.0945334 | 0.1350034− | 0.0708909 | 0.140845 | 0.008689 |
| 0.1666471 | 0.0967140 | 0.1450187− | 0.0724239 | 0.160833 | 0.009691 |
| 0.1767305 | 0.0987737 | 0.1649581− | 0.0751582 | 0.170818 | 0.010172 |
| 0.1868479 | 0.1007156 | 0.1748704− | 0.0763772 | 0.180794 | 0.010634 |
| 0.1969890 | 0.1025406 | 0.1847321− | 0.0775132 | 0.190763 | 0.011075 |
| 0.2071432 | 0.1042530 | 0.1945457− | 0.0785734 | 0.200725 | 0.011493 |
| 0.2173005 | 0.1058523 | 0.2043217− | 0.0795626 | 0.210685 | 0.011886 |
| 0.2274565 | 0.1073408 | 0.2140804− | 0.0804893 | 0.220644 | 0.012251 |
| 0.2376083 | 0.1087236 | 0.2238342− | 0.0813589 | 0.230604 | 0.012591 |
| 0.2579014 | 0.1111770 | 0.2335912− | 0.0821677 | 0.240564 | 0.012908 |
| 0.2680426 | 0.1122538 | 0.2433524− | 0.0829167 | 0.260489 | 0.013472 |
| 0.2781788 | 0.1132351 | 0.2628954− | 0.0842424 | 0.270454 | 0.013723 |
| 0.2883127 | 0.1141203 | 0.2726773− | 0.0848174 | 0.280419 | 0.013955 |
| 0.2984436 | 0.1449153 | 0.2824640− | 0.0853348 | 0.290385 | 0.014167 |
| 0.3085706 | 0.1156210 | 0.2922552− | 0.0857963 | 0.300351 | 0.014362 |
| 0.3186916 | 0.1162431 | 0.3020494− | 0.0862013 | 0.310319 | 0.014539 |
| 0.3288054 | 0.1167787 | 0.3118513− | 0.0865532 | 0.320289 | 0.014700 |
| 0.3591160 | 0.1179088 | 0.3314845− | 0.0870991 | 0.340233 | 0.014977 |
| 0.3389137 | 0.1172345 | 0.3210635− | 0.0868533 | 0.330260 | 0.014845 |
| 0.3692132 | 0.1181273 | 0.3413153− | 0.0872910 | 0.360182 | 0.015199 |
| 0.3793128 | 0.1182625 | 0.3609971− | 0.0875216 | 0.370157 | 0.015291 |
| 0.3894128 | 0.1183159 | 0.3708429− | 0.0875560 | 0.380132 | 0.015371 |
| 0.3995082 | 0.1182776 | 0.3806863− | 0.0875313 | 0.390107 | 0.015440 |
| 0.4095942 | 0.1881480 | 0.3905292− | 0.0874466 | 0.400084 | 0.015496 |
| 0.4196758 | 0.1179252 | 0.4003810− | 0.0872965 | 0.410062 | 0.015541 |
| 0.4297553 | 0.1176142 | 0.4102440− | 0.0870768 | 0.420042 | 0.015576 |
| 0.4398348 | 0.1172149 | 0.4201154− | 0.0867841 | 0.430022 | 0.015600 |
| 0.4599862 | 0.1161652 | 0.4299889− | 0.0864251 | 0.440003 | 0.015614 |

206 Airfoil Section

| Thickness | | | | Camber | |
|---|---|---|---|---|---|
| Upper x/c | | Lower y/c | | x/c | t/c |
| 0.4700565 | 0.1155143 | 0.4398643− | 0.0859978 | 0.459966 | 0.015615 |
| 0.4801210 | 0.1147831 | 0.4596251− | 0.0849462 | 0.469949 | 0.015601 |
| 0.4901810 | 0.1339728 | 0.4695138− | 0.0843232 | 0.479933 | 0.015579 |
| 0.5002404 | 0.1130827 | 0.4794102− | 0.0836360 | 0.489918 | 0.015547 |
| 0.5103015 | 0.1121163 | 0.4893132− | 0.0828897 | 0.499904 | 0.015508 |
| 0.5203632 | 0.1110721 | 0.4992188− | 0.0820776 | 0.509890 | 0.015460 |
| 0.5304269 | 0.1099494 | 0.5091228− | 0.0812072 | 0.519875 | 0.015405 |
| 0.5404896 | 0.1087489 | 0.5190241− | 0.0802729 | 0.529861 | 0.015341 |
| 0.5606143 | 0.1061118 | 0.5289254− | 0.0792781 | 0.539846 | 0.015269 |
| 0.5706759 | 0.1046729 | 0.5388258− | 0.0782215 | 0.559818 | 0.015095 |
| 0.5807421 | 0.1031494 | 0.5586311− | 0.0759323 | 0.569804 | 0.014995 |
| 0.5908212 | 0.1015419 | 0.5685344− | 0.0746934 | 0.579789 | 0.014883 |
| 0.6009062 | 0.0998400 | 0.5784312− | 0.0733938 | 0.589772 | 0.014763 |
| 0.6109733 | 0.0980535 | 0.5883111− | 0.0720262 | 0.599753 | 0.014630 |
| 0.6210291 | 0.0961938 | 0.5981812− | 0.0705903 | 0.609737 | 0.014483 |
| 0.6310839 | 0.0942647 | 0.6080751− | 0.0690976 | 0.619724 | 0.014323 |
| 0.6411375 | 0.0922779 | 0.6179863− | 0.0675578 | 0.629711 | 0.014149 |
| 0.6612344 | 0.0881685 | 0.6278985− | 0.0659766 | 0.639698 | 0.013965 |
| 0.6712785 | 0.0860620 | 0.6378120− | 0.0643577 | 0.659674 | 0.013556 |
| 0.6813262 | 0.0839301 | 0.6576531− | 0.0610661 | 0.669662 | 0.013332 |
| 0.6913758 | 0.0817744 | 0.6675779− | 0.0594074 | 0.679649 | 0.013094 |
| 0.7014186 | 0.0795880 | 0.6774974− | 0.0577513 | 0.689635 | 0.012843 |
| 0.7114460 | 0.0773754 | 0.6874127− | 0.0560974 | 0.699623 | 0.012575 |
| 0.7314629 | 0.0728759 | 0.6973389− | 0.0544469 | 0.709613 | 0.012292 |
| 0.7414549 | 0.0705987 | 0.7072846− | 0.0528000 | 0.729601 | 0.011679 |
| 0.7614166 | 0.0660085 | 0.7272297− | 0.0495261 | 0.739598 | 0.011351 |
| 0.7713877 | 0.0636960 | 0.7372246− | 0.0479047 | 0.759595 | 0.010662 |
| 0.7813520 | 0.0613754 | 0.7572429− | 0.0446920 | 0.769595 | 0.010302 |
| 0.7913076 | 0.0590461 | 0.7672649− | 0.0430993 | 0.779597 | 0.009933 |
| 0.8012563 | 0.0567045 | 0.7772974− | 0.0415164 | 0.789600 | 0.009555 |
| 0.8112008 | 0.0543550 | 0.7873409− | 0.0399428 | 0.799605 | 0.009169 |
| 0.8211436 | 0.0519998 | 0.7973953− | 0.0383729 | 0.809610 | 0.008776 |
| 0.8410295 | 0.0472738 | 0.8074538− | 0.0368092 | 0.819615 | 0.008379 |
| 0.8609132 | 0.0425414 | 0.8175139− | 0.0352476 | 0.839627 | 0.007570 |
| 0.8708551 | 0.0401804 | 0.8376381− | 0.0321391 | 0.859639 | 0.006739 |
| 0.8807961 | 0.0378258 | 0.8577643− | 0.0290681 | 0.869646 | 0.006316 |
| 0.8907379 | 0.0354813 | 0.8678295− | 0.0275538 | 0.879653 | 0.005886 |
| 0.9006792 | 0.0331461 | 0.8778953− | 0.0260579 | 0.889660 | 0.005450 |
| 0.9106206 | 0.0308159 | 0.8879606− | 0.0245851 | 0.899666 | 0.005007 |
| 0.9205589 | 0.0284867 | 0.8980244− | 0.0231356 | 0.909673 | 0.004556 |
| 0.9304965 | 0.0261514 | 0.9080898− | 0.0217071 | 0.919679 | 0.004097 |
| 0.9404312 | 0.0238123 | 0.9181566− | 0.0202955 | 0.929686 | 0.003627 |
| 0.9602938 | 0.0191306 | 0.9282261− | 0.0189000 | 0.939692 | 0.003148 |
| 0.9702219 | 0.0168040 | 0.9382964− | 0.0175185 | 0.959704 | 0.002157 |
| 0.9801487 | 0.0145904 | 0.9584437− | 0.0148181 | 0.969711 | 0.001643 |
| 0.9900742 | 0.0122718 | 0.9685225− | 0.0135191 | 0.979720 | 0.001115 |
| 1.0000000 | 0.0101338 | 0.9786068− | 0.0122802 | 0.989731 | 0.000572 |
|  |  | 0.9886963− | 0.0111282 | 0.999745 | 0.000014 |
|  |  | 1.0000000− | 0.0099920 |  |  |

Figure 2:
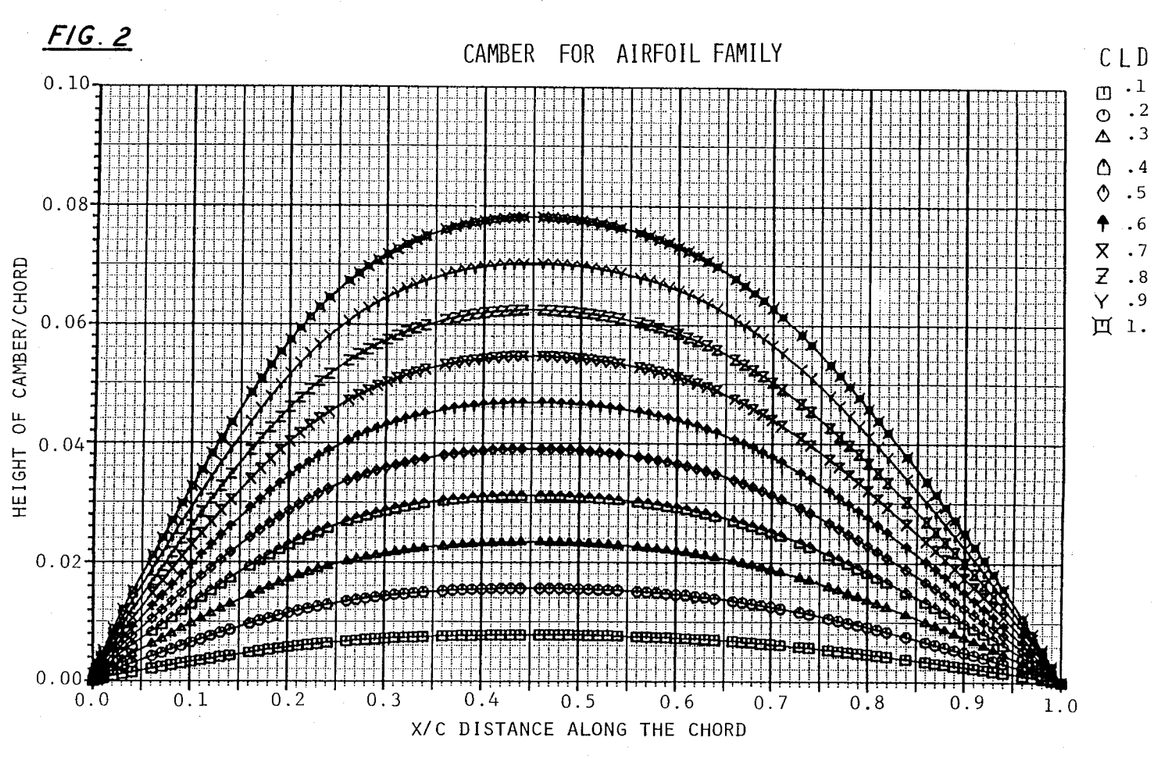
FIG. 2 is a graphical representation of the camber lines of the airfoil family of the present invention, x/c being indicative of dimensionless locations on the chord line, the height of the camber/chord being indicative of the dimensionless height of the camber line from the airfoil chord.

Each airfoil section has a unique location of maximum thickness in conjunction with a camber having an apogee at about 0.45 x/c (See FIG. 2). The position of the maximum thickness of each section moves away from the airfoil section leading edge from the root portion 20 to the tip portion 15 of the blade (See FIG. 4). The maximum thickness of the 206 section is at about 0.3894 x/c. The maximum thickness of the 136 section is at about 0.3896 x/c. The maximum thickness of the 85 section is at about 0.3997 x/c. The maximum thickness of the 57 section is at about 0.4099 x/c. The maximum thickness of the 39 section is at about 0.42001 x/c. The maximum thickness of the 29 section is at about 0.42004 x/c. The maximum thickness of the 23 section is at about 0.42008 x/c. By moving the position of the maximum thickness away from the airfoil section leading edge from the root of the blade towards the tip, boundary layer separation is minimized. When the airfoils are incorporated in a single propeller blade, smooth continuous upper and lower surfaces result.

Each airfoil also has a relatively blunt leading edge and trailing edge compared to the NACA series 16 airfoil (see FIG. 4). Each of the airfoils is characterized by a relatively thick trailing edges as follows: the 23 section thickness is about 0.0023; the 29 section thickness is about 0.0029; the 39 section thickness is about 0.0038; the 57 section thickness is about 0.0056; the 85 section thickness is about 0.0084; the 136 section thickness is about 0.0133; and, the 206 section thickness is about 0.0201. The relatively thick trailing edges provide a blade that is easier to construct and handle compared to the NACA 16 blade which has a relatively thin and sharp trailing edge.

The camber for each airfoil section of the invention depends generally on the desired lift coefficient for each airfoil section within the blade. FIG. 2 shows the camber lines that each airfoil may utilize depending on such desired lift coefficient (CLD). The camber lines may be scaled (i.e. shaped similarly to the camber lines of FIG. 2 but on a different scale) depending on the desired lift coefficient. For instance, for the particular blade described above; the 23 airfoil section has a desired CLD of about 0.31, the 29 airfoil section has a desired CLD of about 0.33, the 39 airfoil section has a desired CLD of about 0.32, the 57 airfoil section has a desired CLD of about 0.288, the 85 airfoil section has a desired CLD of about 0.20, the 136 airfoil section has a desired CLD of about 0.10 and the 206 airfoil section has a desired CLD of about 0.09.

Figure 3:
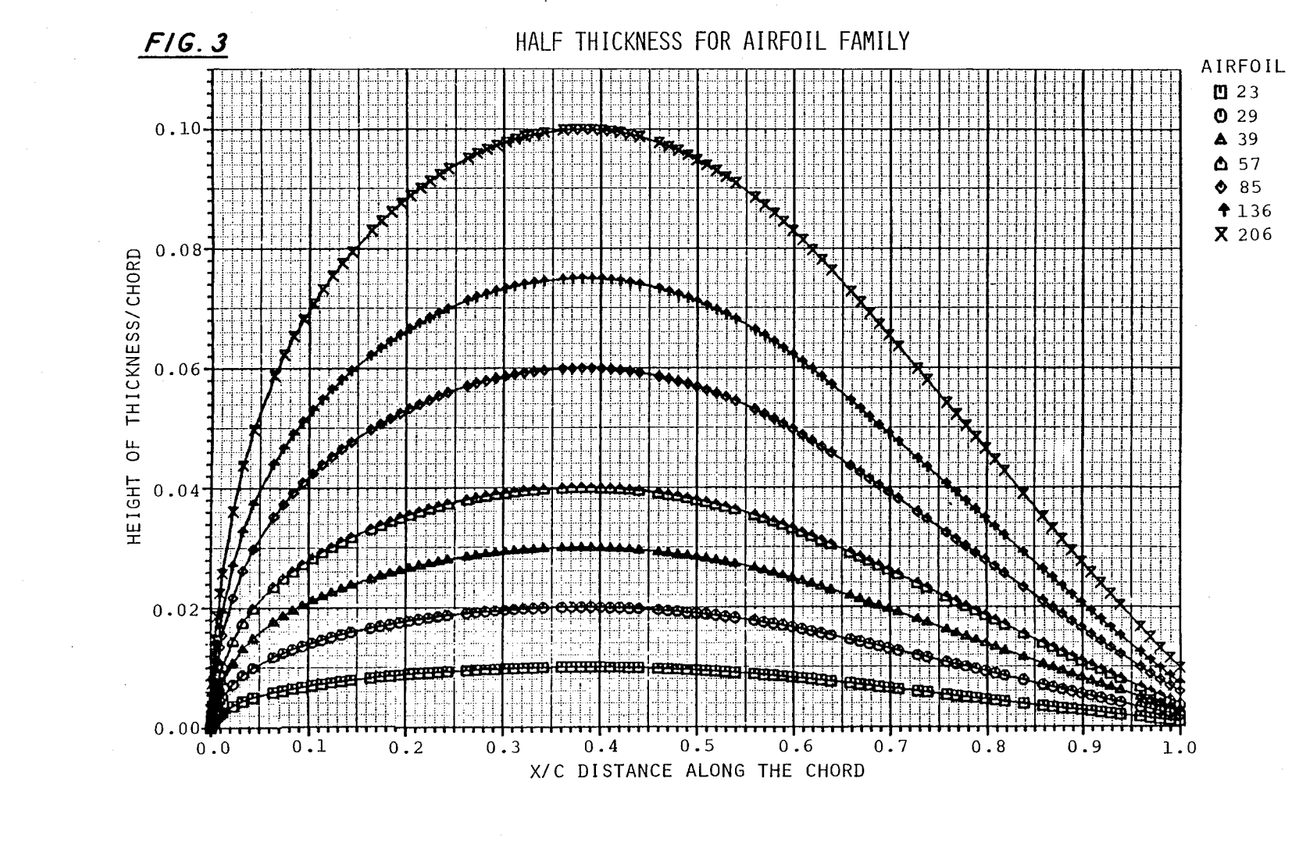
FIG. 3 is a graphical representation of the thickness of the airfoil sections of the present invention, the height of thickness to chord being the dimensionless thickness of the airfoils at corresponding chord locations, x/c.

The particular blade described above is designed to cruise optimally at about Mach 0.62 to 0.68. However, as is typical in airfoil families, the camber and thickness of each section may be modified to achieve optimum blade loading for other desired mission profiles. Each thickness may utilize any of the described camber lines or any of a series of scaled camber lines having an apogee at about 0.05 x/c. Similarly, the hickness ratios for each airfoil section may vary if such thicknesses are interpolated from the airfoil sections described and shown above (see FIG. 3). By utilizing the airfoil family as described above, a particular blade may be designed to operate at mission profiles between Mach 0.50 to 0.70.

The performance of the 23 airfoil section of the airfoil family of the present invention (HS2) is compared with performance of a comparable section of a conventional NACA Series 16 blade below:

| Airfoil | Mn | Cl | Cd | Mns |
|---|---|---|---|---|
| Take-off (102 knots) | | | | |
| HS2 | 0.565 | 0.4411 | 0.0086 | 1.63 |
| NACA 16 | 0.563 | 0.4396 | 0.0106 | 3.494 |
| Loiter (185 knots) | | | | |
| HS2 | 0.673 | 0.199 | 0.0078 | 0.874 |
| NACA 16 | 0.673 | 0.200 | 0.0074 | 1.092 |
| Cruise (353 knots) | | | | |
| HS2 | 0.861 | 0.498 | 0.0111 | 1.176 |
| NACA 16 | 0.861 | 0.499 | 0.0094 | 1.756 | wherein Mn is the speed of the airfoil section, Cl is the lift coefficient, Cd is the drag coefficient and Mns is the speed of the air flow at the surface of the blade, As shown above, the present invention provides essentially equal performance in terms of lift and drag to the NACA 16 airfoil blade. However, the HS2 airfoil section shows significant improvement at cruise, loiter and take-off relating to the Mns. The NACA Series 16 blade shows higher Mach numbers (Mns) above the speed of sound. Such higher Mach numbers cause shock which causes boundary layer separation, and increased drag and noise.

Similarly, the performance of the 39 airfoil section of the airfoil family of the present invention (HS2) is compared with performance of a comparable section of a conventional NACA Series 16 blade below:

| Airfoil | Mn | Cl | Cd | Mns |
|---|---|---|---|---|
| Take-off | | | | |
| HS2 | 0.444 | 0.700 | 0.0107 | 2.605 |
| NACA 16 | 0.444 | 0.6961 | 0.0189 | 5.348 |
| Loiter | | | | |
| HS2 | 0.518 | 0.249 | 0.0083 | 0.598 |
| NACA 16 | 0.518 | 0.249 | 0.0078 | 0.856 |
| Cruise | | | | |
| HS2 | 0.756 | 0.371 | 0.0084 | 0.959 |
| NACA 16 | 0.756 | 0.371 | 0.0086 | 1.230 |

Similar to the 23 section shown above, the present invention provides essentially equal performance in terms of lift and drag to the NACA 16 airfoil blade. However, the HS2 airfoil section shows significant improvement at cruise and take-off relating to the Mns. The higher Mach numbers on the blade surface of the NACA Series 16 blade create shocks which causes boundary layer separation, and increased drag and noise. The present invention minimizes the shocks encountered.

The airfoil family of this invention offers the following advantages over conventional airfoils. The relatively blunt leading edges of the airfoil sections minimize foreign object damage and are also easier to manufacture than the sharper leading edges of the NACA Series 16 blades. The relatively blunt trailing edge minimizes blade handling problems. Moreover, because the airfoil sections are part of a family, a blade may be designed to provide optimal loading for a particular mission profile from between Mach 0.50 to 0.70.

Although the invention has been shown and described with respect to a best mode embodiment thereof, it should be understood by those skilled in the art that the foregoing and various other changes, omissions, and additions in the form and detail thereof maybe made therein without departing from the spirit and scope of the invention.

Having thus described the invention what is claimed is:

1. A blade having a plurality of airfoil sections, a root portion, and a tip portion, said blade being characterized by :

each section having along substantially the entire length thereof, a cross sectional shape characterized by a blunt parabolic leading edge, a maximum thickness between about the 38% chord to about the 42% chord, a camber having an apogee at about a 45% chord, and a relatively blunt trailing edge; and, a plurality of sections tapering from an airfoil section having a thickness ratio of twenty percent contiguous to the root of said blade to an airfoil section having a thickness ratio of two percent contiguous to the tip of said blade, and as said airfoil sections taper from said 20% to said 2% thickness ratio along said blade, the position of said maximum thickness of said airfoil sections progresses from said about 38% to said about 42% chord line.

2. The blade of claim 1 wherein said blade is further characterized by:
a first of said airfoil sections near said root portion having a thickness ratio of about 0.20 and a maximum thickness at about 0.3894 x/c, a second of said of said airfoil sections contiguous to said first airfoil section and having a maximum thickness at about 0.3896 x/c, a third of said airfoil sections contiguous to said second airfoil section and having a maximum thickness ratio at approximately 0.3997 x/c, a fourth of said airfoil sections contiguous to said third airfoil section and having a maximum thickness ratio at approximately 0.4099 x/c, a fifth of said airfoil sections contiguous to said fourth airfoil section and having a maximum thickness ratio at approximately 0.4200 x/c, a sixth of said airfoil sections contiguous to said fifth airfoil sections and having a maximum thickness ratio at 0.42004 x/c, and a seventh airfoil section contiguous to said sixth airfoil section and to said tip and having a thickness ratio of about 0.02 and a maximum thickness ratio at approximately 0.42008 x/c, wherein x/c is a dimensionless length along the chord of each of said airfoil shapes.

* * * * *